US012783778B2

(12) United States Patent
Widiger et al.

(10) Patent No.: US 12,783,778 B2
(45) Date of Patent: Nov. 3, 2026

(54) WIRING PATTERN-BASED PARASITIC CAPACITANCE EXTRACTION

(71) Applicant: INTERNATIONAL BUSINESS MACHINES CORPORATION, Armonk, NY (US)

(72) Inventors: David J. Widiger, Pflugerville, TX (US); Ronald Dennis Rose, Essex Junction, VT (US); Steven Joseph Kurtz, Austin, TX (US); Susan Elizabeth Cellier, Hopewell Junction, NY (US); Lewis William Dewey, III, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 516 days.

(21) Appl. No.: 18/423,563

(22) Filed: Jan. 26, 2024

(65) Prior Publication Data

US 2025/0245411 A1 Jul. 31, 2025

(51) Int. Cl.
*G06F 30/392* (2020.01)
*G06F 30/367* (2020.01)
(Continued)

(52) U.S. Cl.
CPC .......... *G06F 30/392* (2020.01); *G06F 30/367* (2020.01); *G06F 2119/10* (2020.01); *G06F 2119/12* (2020.01)

(58) Field of Classification Search
USPC .......................................................... 716/119
See application file for complete search history.

(56) References Cited

U.S. PATENT DOCUMENTS 6,061,508 A 5/2000 Mehrotra et al.
6,185,722 B1 2/2001 Darden et al.
(Continued)

FOREIGN PATENT DOCUMENTS

| | | | | |
|---|---|---|---|---|
| CN | 102799732 A * | 11/2012 | ............. | G06F 30/39 |
| JP | 2005228008 A * | 8/2005 | ........... | G06F 30/367 |
| WO | WO-2005048309 A2 * | 5/2005 | ........... | G06F 30/367 |

OTHER PUBLICATIONS

Chamon et al.; "A Superconducting Circuit Realization Of Combinatorial Gauge Symmetry", Cornell University Library, arXiv:2006.10060v2, published Jun. 8, 2021 (15 pages) (Year: 2021).
(Continued)

*Primary Examiner* — Mohammed Alam
(74) *Attorney, Agent, or Firm* — Edward Wixted, Esq.; Kevin P. Radigan, Esq.; Heslin Rothenberg Farley & Mesiti P.C.

(57) ABSTRACT

A target wire is separated into one set of segments based on effective spaces of crossing wires at one target-wire side, and another set of segments based on effective spaces of crossing wires at another target-wire side. Effective widths of crossing wires at the one and other target-wire sides are accumulated. One effective length factor for crossing wires at the one target-wire side is determined, and another effective length factor for crossing wires at the other target-wire side is determined. One or more capacitance values are ascertained for the one and other target-wire sides with reference to a data structure of capacitance per-unit-length for identified configurations. A total capacitance is determined using the effective length factors, and the ascertained capacitance values. An impact of the determined total capacitance on circuit performance is assessed, and based on the assessing, the wiring pattern of the integrated circuit is modified.

20 Claims, 17 Drawing Sheets

(51) Int. Cl.

| | |
|---|---|
| ***G06F 119/10*** | (2020.01) |
| ***G06F 119/12*** | (2020.01) |

(56) References Cited

U.S. PATENT DOCUMENTS

| | | | | |
|---|---|---|---|---|
| 6,530,066 | B1 | 3/2003 | Ito et al. | |
| 6,574,782 | B1 | 6/2003 | Dewey, III et al. | |
| 6,643,831 | B2 | 11/2003 | Chang et al. | |
| 7,629,694 | B2 | 12/2009 | Mouttet | |
| 7,692,694 | B2 | 4/2010 | Shiga | |
| 7,964,443 | B2 | 6/2011 | Zhang et al. | |
| 8,799,842 | B2 | 8/2014 | Tutuianu et al. | |
| 9,886,541 | B2 * | 2/2018 | Allen | G06F 30/394 |
| 10,360,338 | B2 | 7/2019 | Cellier et al. | |
| 10,460,068 | B2 | 10/2019 | Rose et al. | |
| 10,831,974 | B2 | 11/2020 | Lu et al. | |
| 10,872,185 | B1 | 12/2020 | Naswa et al. | |
| 11,043,986 | B2 | 6/2021 | Burton | |
| 11,176,308 | B1 * | 11/2021 | Widiger | G06F 30/398 |
| 11,314,916 | B2 * | 4/2022 | Widiger | G06F 30/392 |
| 2020/0134129 | A1 * | 4/2020 | Widiger | G06F 30/3312 |
| 2023/0075616 | A1 | 3/2023 | Lius et al. | |
| 2023/0186009 | A1 | 6/2023 | Fujimura et al. | |
| 2025/0245411 | A1 * | 7/2025 | Widiger | G06F 30/392 |

OTHER PUBLICATIONS

Hsiao et al.; "Efficient Capacitance Solver For 3D Interconnect Based On Template-Instantiated Basis Functions", 18th EPEPS/IEEE Conf., dated Oct. 19-21, 2009 (4 pages) (Year: 2009).

Ma et al., "Extraction Of Interconnect Parasitic Capacitance Matrix Based On Deep Neural Network", Electronics, vol. 12, Issue 6, published Mar. 17, 2023 (18 pages) (Year: 2023).

Uddin et al., "A Broadband Polarized Metamaterial Absorber Driven By Strong In Sensibility And Proximity Effects", IEEE Access, vol. 9, published Sep. 20, 2021 (13 pages) (Year: 2021).

Yang et al., "Z3 Quantum Double In A Superconducting Wire Array", PRX Quantum, vol. 2, Issue 3, published Aug. 13, 2021 (17 pages) (Year: 2021).

Widiger, David J., et al., "Process of Fitting Function Parameters that Facilitates Accurate Pattern-Based 3D Capacitance Extraction", U.S. Appl. No. 18/507,309, filed Nov. 13, 2023 (61 pages) (Year: 2023).

* cited by examiner

WIRING PATTERN-BASED PARASITIC CAPACITANCE EXTRACTION

BACKGROUND

The present invention relates to the design and manufacture of integrated circuits (ICs), and specifically, to very large scale integration (VLSI) designs and devices based on the analysis and optimization of such circuits.

Parasitic capacitance is a feature of any integrated circuit design. Parasitic capacitance occurs when two different charges are present on adjacent wires that are separated by a dielectric, such as in the back-end-of-line (BEOL) portion of a circuit. The differing charges can momentarily generate voltage between the adjacent wires, which can confound the intended scheme of voltages within the circuit and alter circuit timing. Accordingly, in designing integrated circuits, one aspect is to reduce parasitic capacitances within the circuit.

SUMMARY

Certain shortcomings of the prior art are overcome, and additional advantages are provided herein through the provision of a computer-implemented method, which includes: obtaining a wiring pattern of an integrated circuit for performing pattern-based capacitance extraction, and separating, at least one processor set, a target wire included in the wiring pattern into one set of segments based on effective spaces of crossing wires on one target-wire side, and separating, by the at least one processor set, the target wire into another set of segments based on effective spaces of crossing wires on another target-wire side. Further, the method includes accumulating, by the at least one processor set, effective widths of crossing wires at the one target-wire side, and accumulating effective widths of crossing wires at the other target-wire side. Further, the method includes determining, by the at least one processor set, one effective length factor for crossing wires at the one target-wire side using the effective widths of crossing wires at the one target-wire side, and another effective length factor for crossing wires at the other target-wire side using the effective widths of crossing wires at the other target-wire side. Further, the method includes ascertaining, the by at least one processor set with reference to a data structure of capacitances per-unit-length for identified configurations, one or more capacitance values for the one target-wire side and one or more capacitance values for the other target-wire side, and determining a total capacitance corresponding to the target wire using the one effective length factor, the other effective length factor, and the ascertained capacitance values for the one target-wire side and the other target-wire side. In addition, the method includes assessing an impact of the determined total capacitance on circuit performance, and based on the assessing of the impact on the circuit performance, producing a modified design by modifying the wiring pattern of the integrated circuit.

Computer program products and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Aspects of the present disclosure and certain features, advantages, and details thereof, are explained more fully below with reference to the non-limiting example(s) illustrated in the accompanying drawings. Descriptions of well-known systems, devices, processing techniques, etc., are omitted so as not to unnecessarily obscure the disclosure in detail. It should be understood, however, that the detailed description and the specific example(s), while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, where the same or similar reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, systems, or tools only as examples, and not by way of limitation. Furthermore, the illustrative embodiments are described in certain instances using particular software, hardware, tools, and/or data processing environments only as example for clarity of description. The illustrative embodiments can be used in conjunction with other comparable or similarly purposed structures, systems, applications, architectures, etc. One or more aspects of an illustrative control embodiment can be implemented in software, hardware, or a combination thereof.

Figure 1:
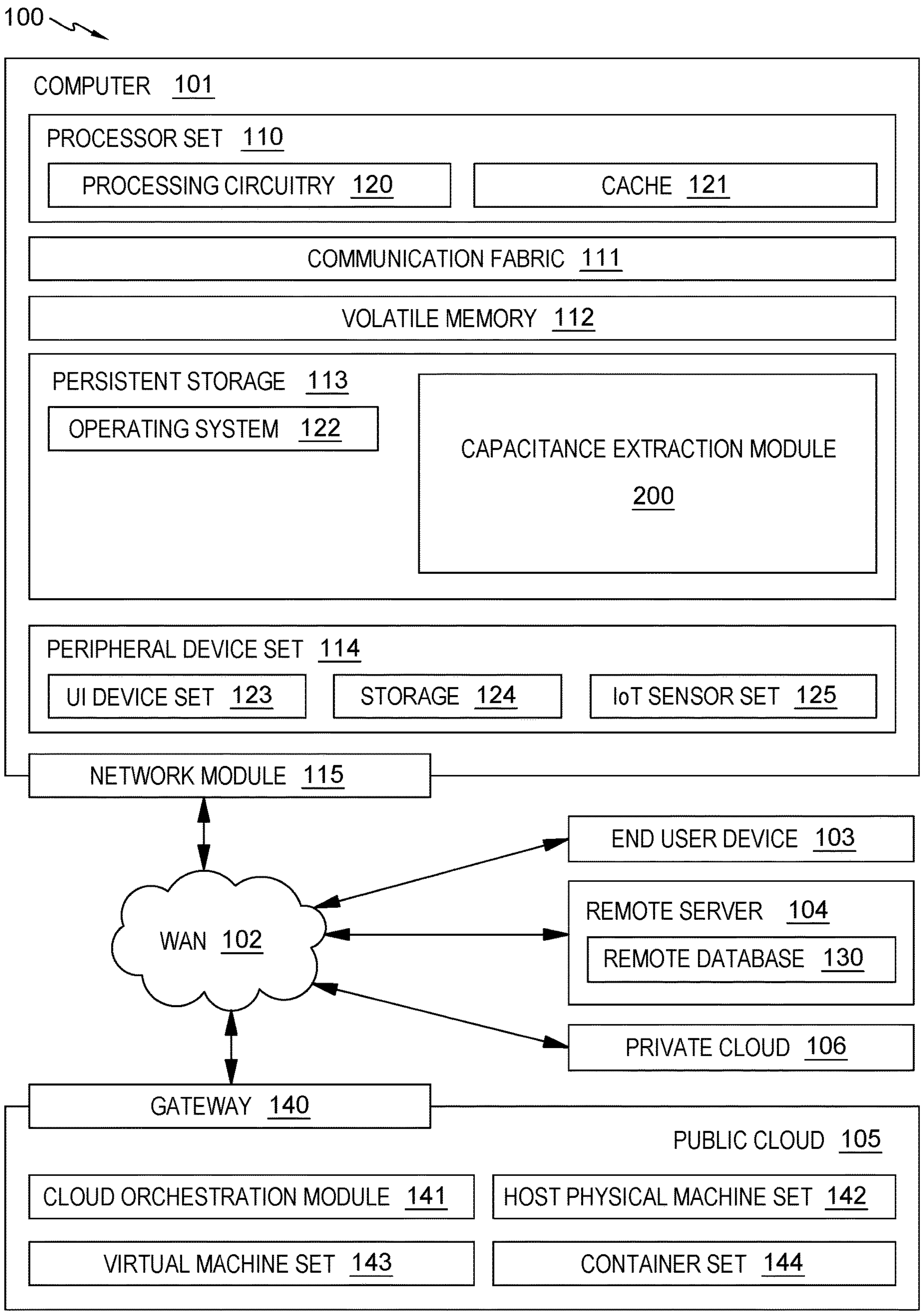
FIG. 1 depicts one example of a computing environment to include and/or use one or more aspects of the present disclosure.

As understood by one skilled in the art, program code, as referred to in this application, can include software and/or hardware. For example, program code in certain embodiments of the present disclosure can utilize a software-based implementation of the functions described, while other embodiments can include fixed function hardware. Certain embodiments combine both types of program code. Examples of program code, also referred to as one or more programs, are depicted in FIG. 1, including operating system 122 and capacitance extraction module 200, which are stored in persistent storage 113.

One or more aspects of the present disclosure are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one or more processor sets, each with one processor or multiple processors, and/or any other type of environment and/or configuration, etc., that is capable of executing a process (or multiple processes) that, e.g., perform capacitance extraction-related processing, such as disclosed herein. Aspects of the present disclosure are not limited to a particular architecture or environment.

Prior to further describing detailed embodiments of the present disclosure, an example of a computing environment to include and/or use one or more aspects of the present disclosure is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as capacitance extraction module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. Further, in one or more embodiments, one or more of the components/modules of FIG. 1 need not be included in the computing environment and/or are not used for one or more aspects of the present disclosure. Further, in one or more embodiments, additional and/or other components/modules can be used. Other variations are possible.

Figure 2:
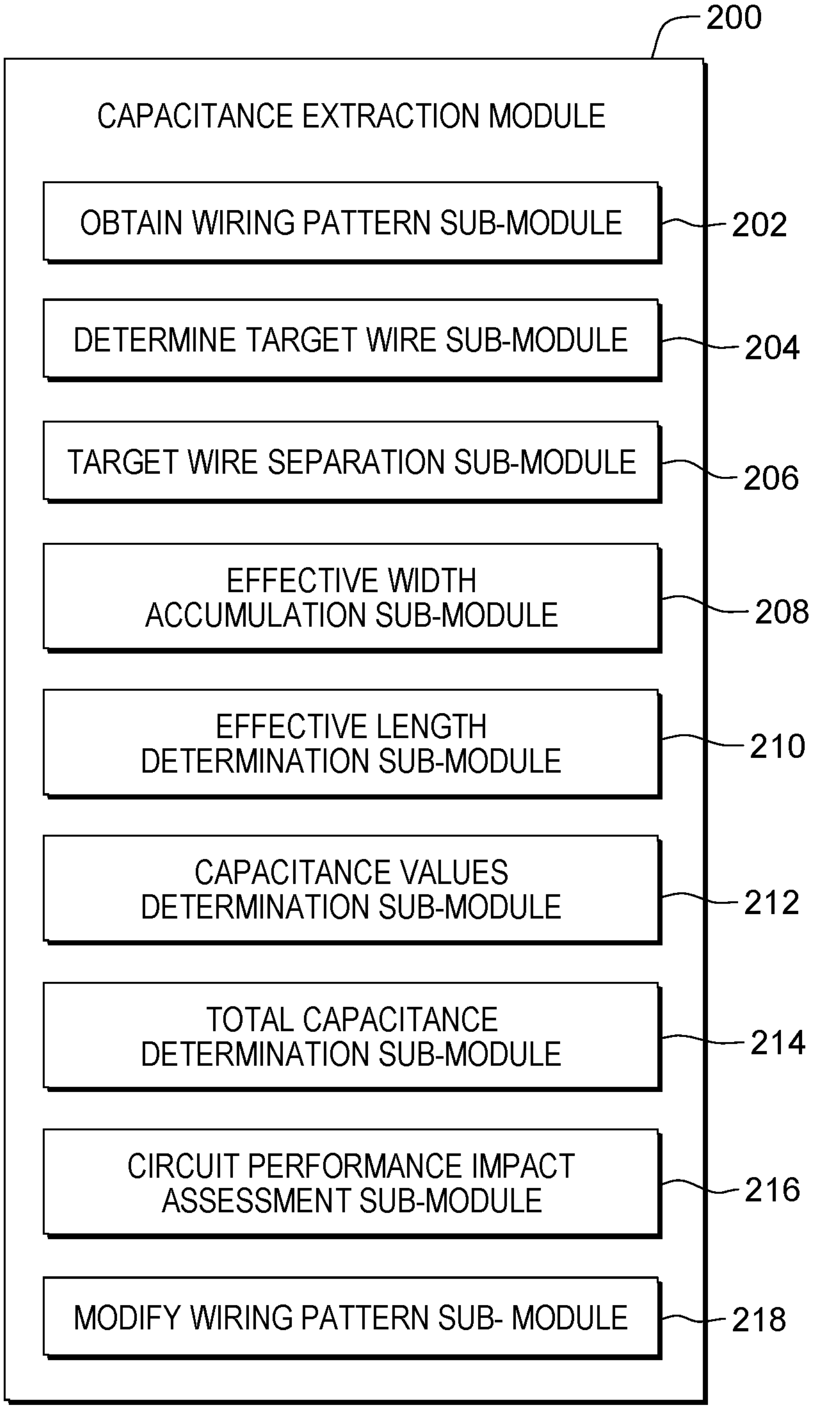
FIG. 2 depicts one embodiment of a computer program product with a capacitance extraction module, in accordance with one or more aspects of the present disclosure.
Figure 3A:
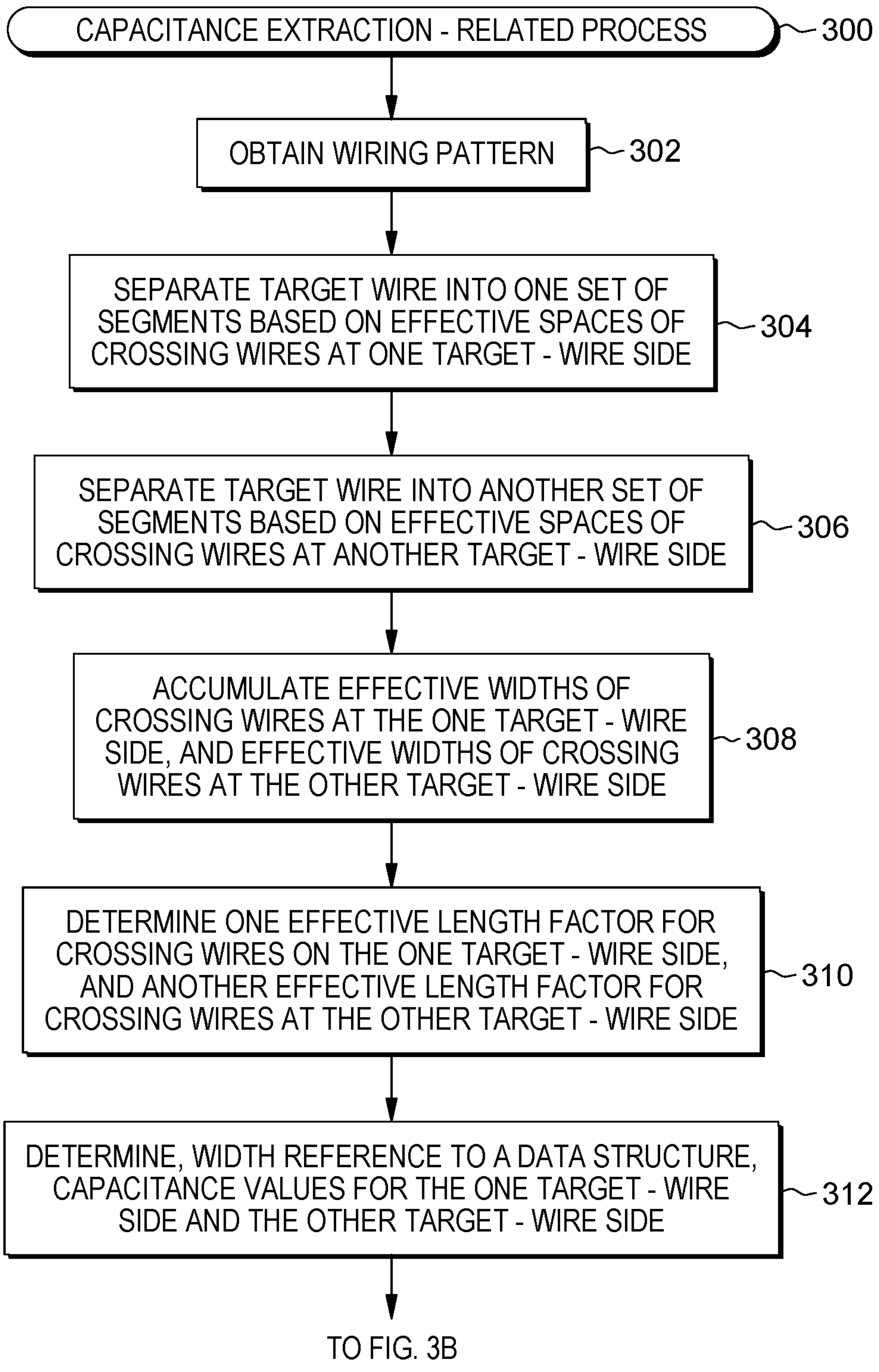
FIGS. 3A-3B depict one embodiment of a capacitance extraction-related process, in accordance with one or more aspects of the present disclosure.
Figure 3B:
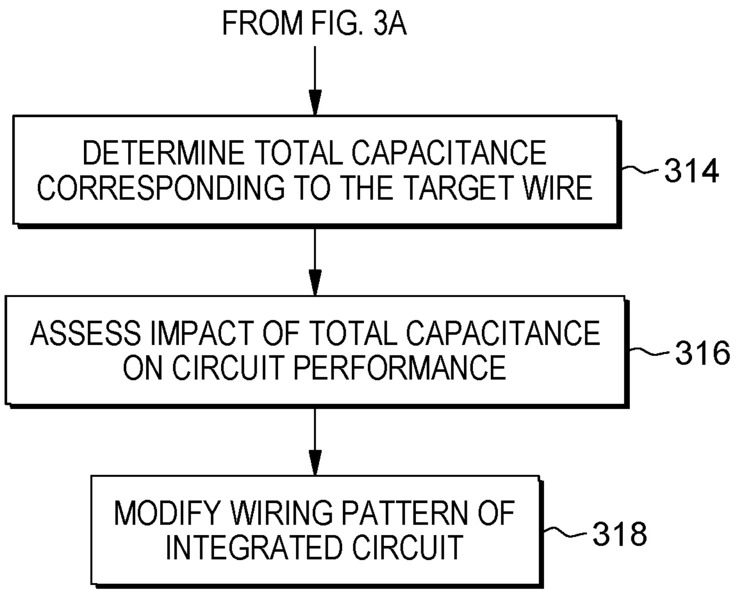

By way of example, one or more embodiments of a capacitance extraction module and process are described initially with reference to FIGS. 2-3B. FIG. 2 depicts one embodiment of capacitance extraction module 200 that includes code or instructions to perform capacitance extraction-related processing, in accordance with one or more aspects of the present disclosure, and FIGS. 3A-3B depict one embodiment of a capacitance extraction-related process, in accordance with one or more aspects of the present disclosure.

Referring to FIGS. 1-2, capacitance extraction module 200 includes, in one example, various sub-modules used to perform processing, in accordance with one or more aspects of the present disclosure. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; one or more processor sets 110 (FIG. 1); processors, such as one or more processors of processor set 110; and/or processing circuitry, such as processing circuitry of processor set 110, etc.

As noted, FIG. 2 depicts one embodiment of a capacitance extraction module 200 which, in one or more embodiments, includes, or facilitates, capacitance extraction-related processing in accordance with one or more aspects of the present disclosure. In the embodiment of FIG. 2, example sub-modules of capacitance extraction module 200 include an obtain wiring pattern sub-module 202 to facilitate obtaining a wiring pattern of an integrated circuit for performing pattern-based capacitance extraction, and a determine target wire sub-module 204 to determine a particular target wire included in the wiring pattern for capacitance extraction processing, in accordance with one or more aspects of the present disclosure. Note that, as used herein, a target wire can mean a portion of a target wire or the entire target wire, depending on the process used. As depicted, capacitance extraction module 200 also includes, in one or more embodiments, a target wire separation sub-module 206 to facilitate separating the target wire into one set of segments based on effective spaces of crossing wires at one target-wire side of the target wire, and separating the target wire into another set of segments based on effective spaces of crossing wires at another target-wire side of the target wire.

In addition, capacitance extraction module 200 includes, in one embodiment, an effective width accumulation sub-module 208 to accumulate effective widths of crossing wires at the one target-wire side, and accumulate effective widths of crossing wires at the other target-wire side. Capacitance extraction module 200 also includes, in one or more embodiments, an effective length determination sub-module 210 to facilitate determining one effective length factor for crossing wires at the one target-wire side, and another effective length factor for crossing wires at the other target-wire side, and a capacitance values determination sub-module 212 to facilitate ascertaining, with reference to a data structure of capacitances per-unit-length for identified configurations, one or more capacitance values for the one target-wire side and one or more capacitance values for the other target-wire side. In addition, capacitance extraction module 212 includes, in one or more embodiments, a total capacitance determination sub-module 214 to determine a total capacitance corresponding to the target wire using, for instance, the one effective length factor, the other effective length factor, and the ascertained capacitance values for the one target-wire side and the other target-wire side.

In one or more implementations, capacitance extraction module 200 further includes a circuit performance impact assessment sub-module 216 to assess impact of the determined total capacitance on circuit performance, and a modify wiring pattern sub-module 218 to produce a modified design, based on the assessing of the impact of the circuit performance, by modifying the wiring pattern of the integrated circuit. Note that although various sub-modules are described herein, capacitance extraction module processing, such as disclosed, can use, or include, additional, fewer, and/or different sub-modules. A particular sub-module can include additional code, including code of other sub-modules, or less code. Further, additional and/or fewer sub-modules can be used. Many variations are possible.

Advantageously, in one or more aspects, improved processing within a computing environment is provided herein by, for instance, leveraging separation of capacitance analysis at different target-wire sides to achieve simplification and speed-up of capacitive extraction-related processing, without significant loss of accuracy. For instance, to allow simplification of the extraction algorithm, and improve processing performance, one or more aspects of the present disclosure recognize that there is a certain amount of screening between capacitive interactions of a target wire with crossing wires on one side of the target wire, and crossing wires at an opposite side of the target wire, such as crossing wires above and below the target wire, and based on the screening, the exact positions of the crossing wires relative to each other on opposite sides of the target wire are considered herein as having a small effect on the capacitances of the target. The capacitance extraction-related processing and analysis disclosed can include, in one or more embodiments, adjustment of crossing wires on opposite sides of the target wire to match different configuration patterns, and the analysis can also include, in one or more embodiments, making tuning-like variations in the crossing wire properties, such as making width adjustments, such as described herein. Processing performance is improved by minimizing the computations needed for each crossing wire, as well as by implementing parallelization of one or more process steps (in one or more embodiments).

In one or more embodiments, the capacitive extraction module is used, in accordance with one or more aspects of the present disclosure, to perform capacitance extraction-related processing. FIGS. 3A-3B depict one example of a capacitance extraction-related process 300, such as disclosed herein. The process is executed, in one or more embodiments, by a computer (e.g., computer 101 (FIG. 1)), and/or one or more processor sets, such as a processor or processing circuitry (e.g., of processor set 110 of FIG. 1). In one example, code or instructions implementing the process, are part of a module, such as capacitance extraction module 200. In other examples, the code can be included in one or more other modules and/or one or more other sub-modules of the one or more other modules. Various options are available.

As illustrated in FIGS. 3A-3B, in one example, capacitance extraction-related process 300 executing on one or more computers (e.g., computer 101 of FIG. 1), one or more processor sets (e.g., processor set 110 of FIG. 1, such as a processor of processing circuitry of the processor set) obtains (e.g., determines, retrieves, receives, etc.) a wiring pattern of an integrated circuit for performing pattern-based capacitance extraction 302. In one or more embodiments, capacitive extraction-related process 300 includes separating, by at least one processor set, a target wire included in the wiring pattern into one set of segments based on effective spaces of crossing wires at one target-wire side of the target wire 304, and separating the target wire into another set of segments based on effective spaces of crossing wires at another target-wire side of the target wire 306.

In one or more embodiments, capacitive extraction-related process 300 further accumulates effective widths of crossing wires at the one target-wire side, and accumulates effective widths of crossing wires at the other target-wire side 308, and determines one effective length factor for crossing wires on the one target-wire side using, in part, the effective widths of crossing wires at the one target-wire side, and another effective length factor for crossing wires at the other target-wire side using, in part, the effective widths of crossing wires at the other target-wire side 310.

In one or more embodiments, capacitance extraction-related process 300 further determines, with reference to a data structure of capacitances per-unit-length for identified configurations, one or more capacitance values for the one target-wire side and one or more capacitance values for the other target-wire side 312, and determines a total capacitance corresponding to the target wire using the one effective length factor, the other effective length factor, and the ascertained capacitance values for the target-wire side and the other target-wire side 314 (as shown in FIG. 3B).

In one or more embodiments, capacitive extraction-related process 300 further assesses an impact of the determined total capacitance on circuit performance 316, and based on assessing of the impact on the circuit performance, produces (where needed) a modified design by modifying the wiring pattern of the integrated circuit 318.

Conventionally, in VLSI (very large-scale integration) digital design, fabricated devices can include millions of transistors implementing hundreds of storage devices, functional logic circuits, and the like. The designs are often segmented or partitioned into sub-blocks (such as cores, units, macros, sub-hierarchies, and the like) to make the design process more manageable. For example, the design, placement, and routing of the circuits may be conducted at both a high-level and sub-block level, where the high-level considers the complete device including all sub-blocks (known as in-context design) and the sub-block level considers the design of a single sub-block (known as out-of-context design). While a sub-block level design may be used in multiple instances within the device, conventionally, only a single version of the design of the sub-block is produced.

Timing analysis and timing considerations for a sub-block conventionally include constraints, such as the specification of the arrival time (AT) for each input signal at the entry of the sub-block and the specification of a required arrival time (RAT) for generating each output signal of the sub-block. The required arrival time must consider the propagation delay through the circuit, including the slew rate of the output signal. The propagation delays, slew rates, and the like are influenced by capacitive loads, including the capacitive effects experienced by signals propagating through metal wires (nets) of the VLSI device.

So-called 2.5D (2.5-dimensional) is a capacitive analysis technique that is fast compared to 3D capacitance analysis methods. Designers look to 2.5D as a solution to increasing macro sizes, larger cores and flat chips, and the desire for better performance in the construction phases of a design where speed is necessary. To simplify the analysis of such designs, 2.5D often makes gross assumptions about the wires above and below a target net during timing analysis. Some techniques replace all metal in layers above and below the target net by simple densities, with one density value per layer, regardless of the actual wire density directly above and below the target wire. Other techniques require all wires to exist on a strict gridded structure and make limiting assumptions about wires over and under a net. While 2.5D methods utilized in the industry provide speedup, the simplifying assumptions degrade accuracy too significantly for current techniques to be useful for, e.g., 7 nanometer (nm) designs. 2.5D refers to a capacitive analysis technique that is fast compared to 3D capacitance analysis methods.

The present disclosure describes one or more non-limiting embodiments, which provide a process, computer program product and system of fitting function parameters that facilitate improved accuracy of a pattern-based 3D capacitance extraction. “Extracting parasitic capacitances” or “capacitance extraction” as described herein refers to a design process step in which the capacitances between various circuit elements are calculated. One mode for extracting capacitances is to use a “field solver” that models the actual wire shape geometry and dielectrics with an algorithm which solves electrostatic equations for capacitance calculation-either a differential or integral form of Maxwell’s equations can be used. The field solver approach is very compute-intensive and can take about one week to complete to an acceptable accuracy for a moderate sized macro of 50,000 nets, even using sophisticated parallel-processing computing hardware.

As will be appreciated by the skilled artisan, the capacitance, C, of a parallel plate capacitor is given by $C=\varepsilon A/d$, where $\varepsilon$ is the permittivity of the dielectric, A is the area, and dis the distance between the plates. With constant area and permittivity, increasing d (spacing) will lower the capacitance C. Increasing the spacing also reduces the chances of dielectric breakdown. While the parasitic capacitance between wires will differ somewhat from the ideal value calculated between parallel plates, the simple formula provides useful insights.

In one or more embodiments, the impact of the capacitance (e.g. parasitic capacitance) on circuit performance is assessed. In one embodiment, the assessment can be accomplished by conventional calculations of timing delays and/or circuit noise. In one or more embodiments, the assessment can additionally, or instead, be accomplished by application of machine learning to a listing of total extracted capacitances for some or all of the wires in the target layer. Then, in response to the assessment of impact on circuit performance, the design of the integrated circuit is modified to adjust the spacing between wires. For example, if the parasitic capacitance is too high, then wire-to-wire spacing can be increased. Parasitic capacitance is not too high, the spacing can be decreased. Optionally, the concepts disclosed herein can further include fabricating an integrated circuit according to the modified design.

For those skilled in the art, there is an understanding that the technology node one uses to build a chip will place some constraints on acceptable wire widths and spacings on any given metal layer. These considerations provide some natural bounds for the number of patterns by specifying min/max widths and spacings for wires. Additionally, there are some physical limits that one might use to set the upper/lower bounds of these values. For example, one might say that if the spacing between wires goes above a certain threshold, treat the distance between wires as infinite. Once upper and lower bounds for these sizes are set, one could then determine how many intermediate sizes one would like to consider in a pattern set. For example, if wire widths are limited to being between 100 nm and 200 nm, one could decide to generate patterns at even intervals of 10 nm between the min and max settings, resulting in eleven allowable wire widths. Of course, the sampling does not need to be uniform, as one might choose to use, for example, samples of 100 nm, 120 nm, 160 nm, 200 nm if that fits the most common wire usage in a design paradigm. One pertinent aspect is that it is possible to develop reasonable constraints on the rules used to generate this reduced pattern database to prevent its size from becoming intractable for real computation. Also, it should be noted that the potential number of wire width/spacing combinations existing in any reduced pattern database pales in comparison to the number of distinct wire patterns possible in a design, where each wire to be analyzed might contain hundreds of crossing wires with varying widths and spacings.

It is observed that the BEOL (back end of the line) wiring of current chip technologies alternates dominant direction through the sequence of metal layers, and as a consequence, it is safe to assume that the wiring immediately above and below the target wire will be predominantly in a direction orthogonal to that of the target, and that the wiring two layers above and below the target will be predominantly in a direction parallel to that of the target.

Certain principles can be inferred from the results of a field solver operating on a sufficiently large number of sample wiring patterns. One particularly useful principle is that for a target shape (a shape for which capacitances are to be calculated), the topology of the lateral shapes (where lateral shapes refer to parallel wires on the same plane as the target wire) to that target is relatively constant for the length of the target; that is, relatively few distinct lateral shapes will exist. Another principle is that, without significant loss of accuracy, the capacitance analysis can be subdivided based on regions of uniform lateral wiring, solving each independently, and combining results to get a total capacitance.

Figure 4:
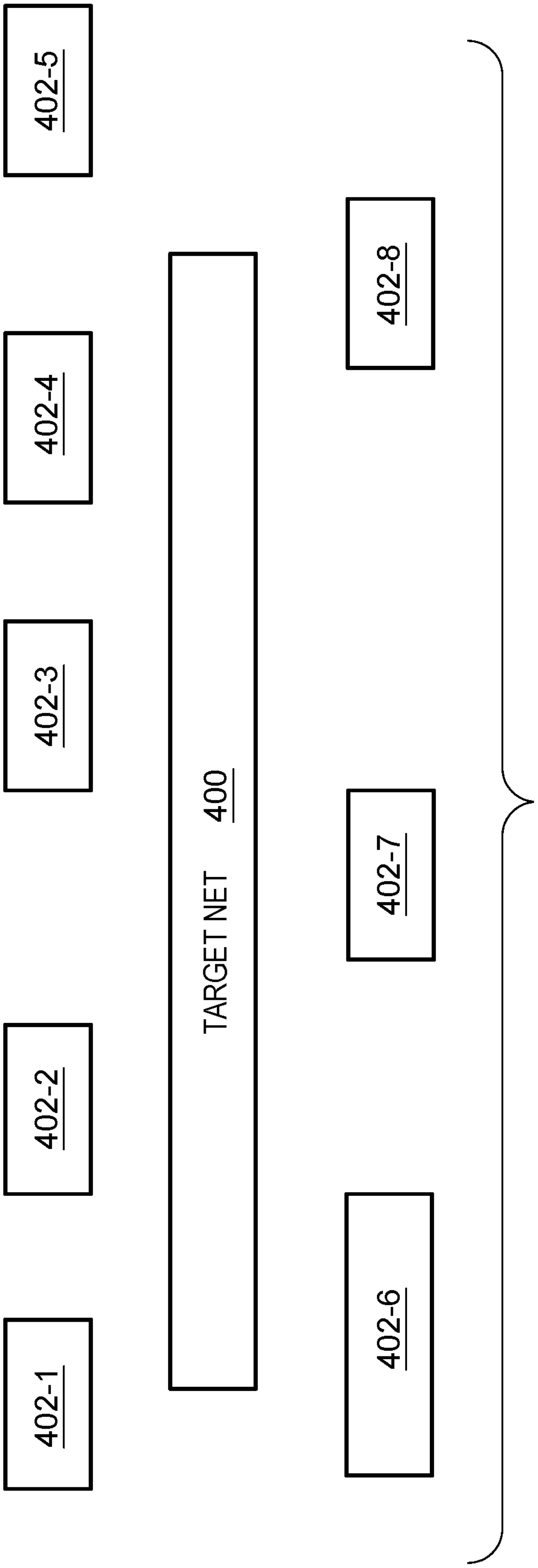
FIG. 4 illustrates a side view representation of a portion of a target net of a VISI design, according to a non-limiting embodiment of the present disclosure.

FIG. 4 illustrates a side view of a portion of a target net 400 of a VLSI design, in accordance with an example embodiment. The illustrated portion corresponds to a section of the target net 400 having a common configuration of lateral neighbor nets, as described more fully below in conjunction with FIG. 6. For example, the illustrated portion in FIG. 6 can have either a neighbor net on both sides of the same layer, a neighbor net on only one side of the same layer, or a neighbor net on neither side of the same layer (also referred to as lateral neighbors herein). Elements 402-1 through 402-8 are discussed below.

Figure 5:
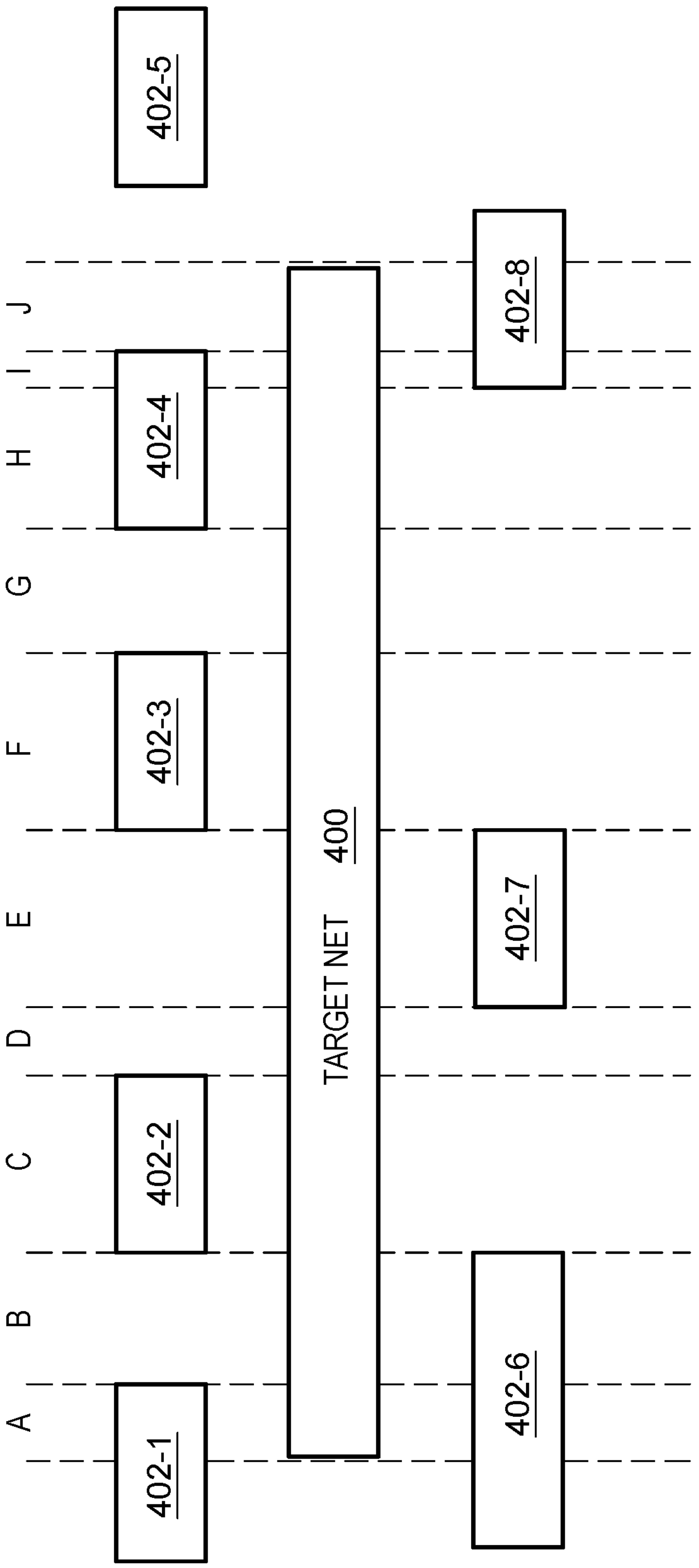
FIG. 5 illustrates a segmentation of the portion of the target net of FIG. 4, based on certain defined relationships, in accordance with an example embodiment of one or more aspects of the present disclosure.

As illustrated in FIG. 5, the target net 400 (where net, wire, and metal are used interchangeably herein) has orthogonal neighbor nets 402-1, 108-2, 402-3, 402-4, 402-5, 402-6, 402-7, 402-8 (collectively referred to as neighbor nets 402, or crossing wires, herein) on the layers that are immediately above target net 400 and immediately below the target net 400. The relationship between target net 400 and its vertical neighbor nets 402 can be characterized by four types of relationships: 1) metal on the layer directly above and on the layer directly below the target net 402; 2) metal on the layer directly above but not on the layer below; 3) metal on the layer directly below but not on the layer above; and 4) no metal on the layer above or on the layer below. The length of the target net 400 can then be divided into segments, where each segment is characterized by one of the four relationships.

FIG. 5 illustrates the segmentation for the portion of the target net 400 of FIG. 4 based on the four defined relationships, in accordance with an example embodiment of one aspect disclosed. As illustrated in FIG. 5, the length of target net 400 has been divided into ten segments (A, B, C, D, E, F, G, H, I, and J). For example, segments A and I are characterized by relationship 1; segments C, F, and H are characterized by relationship 2; segments B, E, and J are characterized by relationship 3; and segments D and G are characterized by relationship 4. These individual metal relationships can be represented with data saved from analyses of simple 2D configurations. Such configurations can include neighboring shapes on the same layer as the target net 400. This segmentation process is used to decompose the disclosed capacitance analysis into several 2D analyses. However, it is important to note that, as described more fully below, this basic form of segmentation based on actual spacings can result in some loss of accuracy due to insufficient modeling of fringing capacitance. Thus, an effective space function method is introduced and used that alters this segmentation process to more accurately account for fringing capacitance.

Example of a Typical 2D Simulation Input

Figure 6:
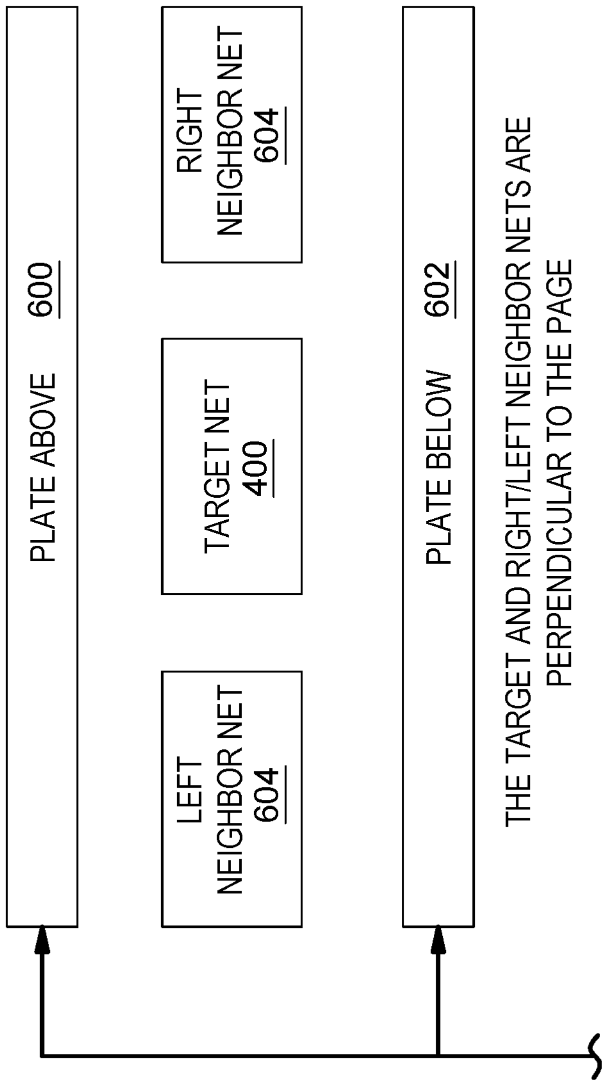
FIG. 6 illustrates a target net having metal directly above, metal directly below, and left and right neighbor nets to either side on the same metal layer, according to a non-limiting embodiment of the present disclosure.

FIG. 6 illustrates a target net 400 having metal directly above (plate 600), metal directly below (plate 602), and left and right neighbor nets 604 to either side on the same layer, in accordance with an example embodiment. In the example of FIG. 6, the plates 600, 602 in the 2D simulation can be thought to represent the crossing neighbor nets 402 that are above and below the target net 400. Neighbor nets that reside two layers above and/or two layers below the target net 400 may also be considered. The configuration of FIG. 6 is analyzed with a highly accurate simulator, such as a field solver, with, for example, a finite difference analysis typically using reflective boundary conditions, a boundary-element analysis, or a random walk analysis. Suitable boundary conditions include reflective boundary conditions where reflecting plates are introduced surrounding the 2D region to be solved; the use of grounded plates surrounding the 2D region; extension of the region to infinity in all directions, and the like. For finite difference and finite element methods, reflective or grounded boundaries are used. For boundary element methods, extension to infinity is often preferred. In one example embodiment, finite difference with reflective boundary conditions is used. Given the teachings herein, the skilled artisan will be able to select appropriate boundary conditions.

In one example embodiment, these cases are pre-analyzed and then retrieved using a capacitance table lookup technique. The following setups can be created to represent possible local relationships, and solved in a field solver, including:

- a neighbor net 604 to the left of the target net 400, a neighbor net 604 to the right of the target net 400, a neighbor net 600 above the target net 400, and a neighbor net 602 below the target net 400;
- a neighbor net 604 to the left of the target net 400, a neighbor net 604 to the right of the target net 400, and a neighbor net 600 above the target net 400;
- a neighbor net 604 to the left of the target net 400, a neighbor net 604 to the right of the target net 400, and a neighbor net 602 below the target net 400;
- a neighbor net 604 to the left of the target net 400 and a neighbor net 604 to the right of the target net 400; and
- all of the above combinations without a left neighbor net 604, all of the above combinations without a right neighbor net 604, and all of the above combinations with no left neighbor net 604 and no right neighbor net 604.

For practical reasons, a maximum lateral distance to a neighbor net 604 is defined based on the wiring layer and the technology, and a neighbor net 604 is considered at that distance even if there is no actual wire that is closer. Thus, the choices listed above reduce to a neighbor net 604 on both sides (with possibly different spacings to each side) together with different combinations of neighbor nets above 600 and below 602 the target net 400. For simplification of the analysis, a plate two layers above will also be assumed if there is no neighbor net 600 directly above the target net 400 and a plate two layers below will be assumed if there is no neighbor net 602 directly below the target net 400.

Thus, in one example embodiment, the following combinations are considered for the scenario with two lateral neighbor nets 604 (with possibly different spacings to each side):

1) metal 600 directly above the target net 400 and a plate two layers below the target net 400;
2) a plate two layers above the target net 400 and metal 602 directly below the target net 400;
3) metal 600 directly above the target net 400 and metal 602 directly below the target net 400; and
4) a plate two layers above the target net 400 and a plate two layers below the target net 400.

Simple target capacitances for the above capacitance Cup, the below capacitance Cdown, the left-side capacitance Cleft, and the right-side capacitance Cright can be calculated from the field solver analyses for each configuration and stored as per-unit-length values for the target net 400.

Effective Space Function Method

Figure 7:
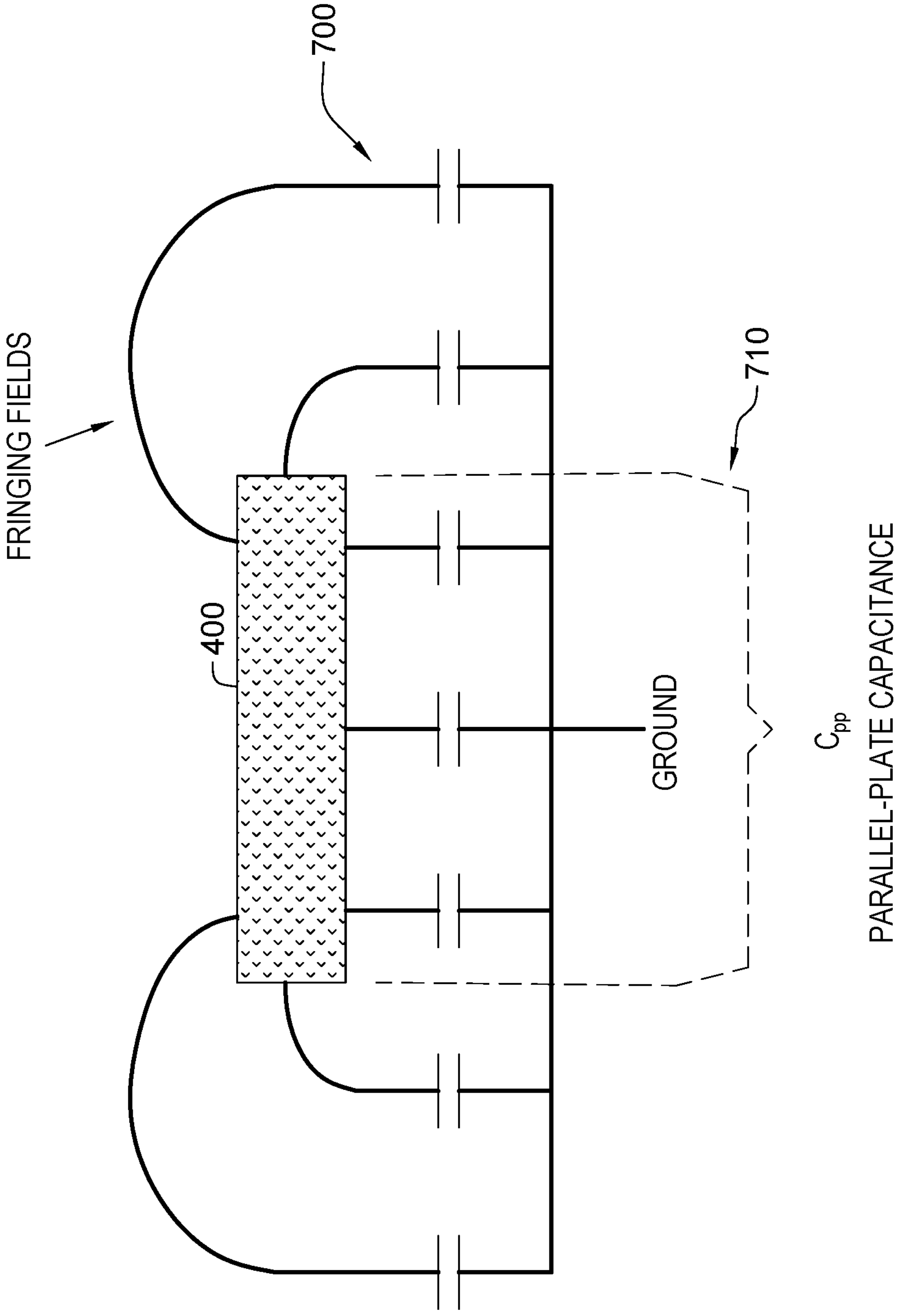
FIG. 7 illustrates fringe capacitance for a target net, according to a non-limiting embodiment of the present disclosure.

FIG. 7 illustrates fringe capacitance 700, and parallel-plate capacitance $C_{PP}$, 710 for a target net 400, in accordance with an example embodiment. It should be noted that, if segmentation (FIG. 5) were performed and capacitance values were calculated based on the actual spacings between crossing wires, inaccuracies would be introduced by these 2D analyses, since the problem is inherently a 3D problem and effects such as fringe capacitance 400 at crossing wire edges would not be taken into account. To overcome this inaccuracy, a modification to the metal shapes and the spacing between them is implemented using an effective space function. A properly chosen effective space function that is formed as a function of the actual space and that offers control of more than one function parameter, can assist in calculating all four capacitance components (Cup, Cdown, Cleft, and Cright) by scaling the 2D capacitance values based on spacing observations. These resulting four capacitance components will closely match field-solver results for wiring cases obeying the orthogonal wiring assumptions.

Figure 8:
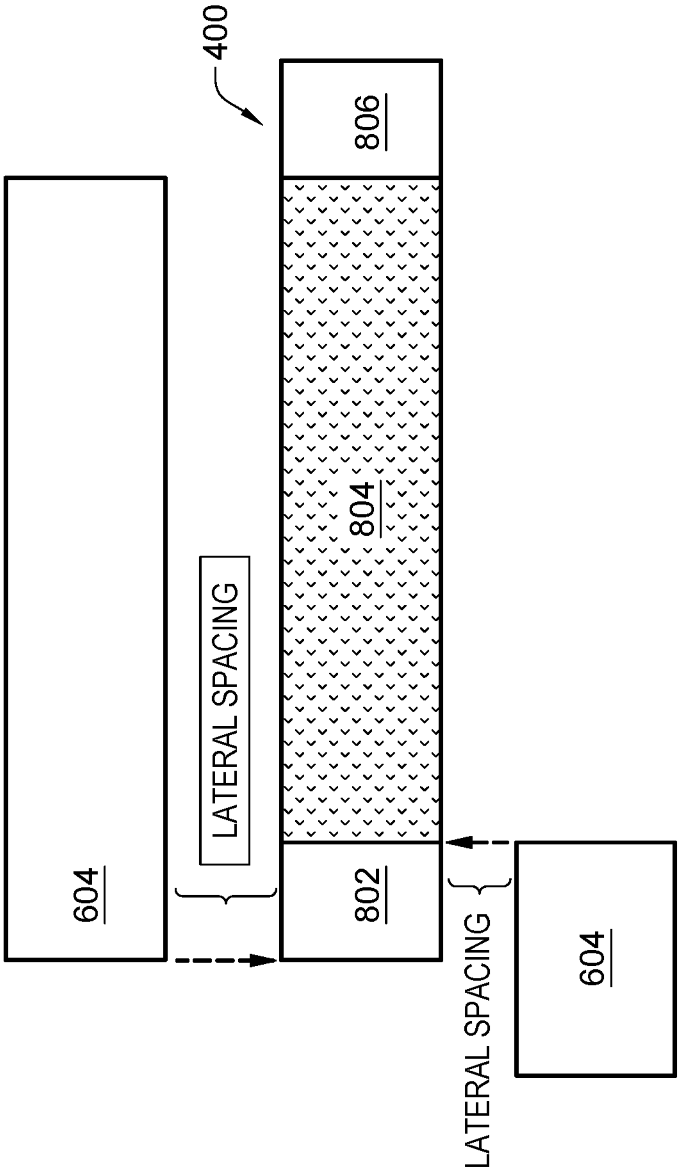
FIG. 8 illustrates a top view of a target net having two neighbor nets on the same layer, according to a non-limiting embodiment of the present disclosure.

FIG. 8 illustrates a top-view of a target net 400 having two neighbor nets 604 on the same layer, in accordance with an example embodiment. In one example embodiment, the target net 400 is split into sections based on the existence or absence of a left neighbor net 604 and the existence or absence of a right neighbor net 604. Each section (referred to as an area herein) is then analyzed individually. For example, target areas 802, 804, 806 of the target net 400 are analyzed individually.

Effective Space Definition

Figure 9:
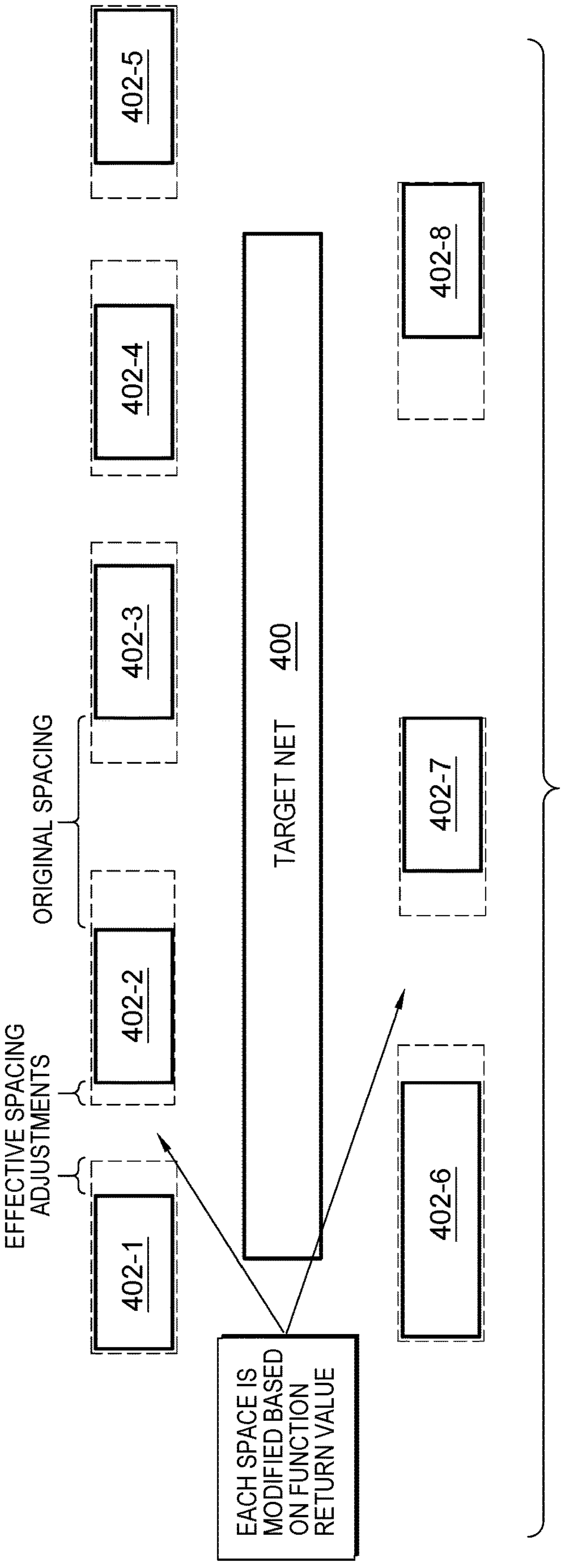
FIG. 9 illustrates a side view of the target net of FIG. 4, where original spacing has been modified to derive effective spacing based on effective spacing function return values, according to a non-limiting embodiment of the present disclosure.

FIG. 9 illustrates a side-view of a target net with cross-sectional views of the neighbor nets 402 on the layer above and the layer below the target net 400, in accordance with an example embodiment. Recall that the 2D capacitances are defined per-unit-length of a wire. In one example embodiment, an effective spacing is defined that is used in place of the actual spacing when apportioning the various 2D results. Thus, once a target area 802, 804, 806 (FIG. 8) is selected, the original physical spacing (Sp) is adjusted based on the effective space adjustments. As illustrated in FIG. 9, solid rectangles represent the physical width of the neighbor nets 402 and dashed rectangles represent the effective width of the neighbor nets 402.

In one or more embodiments, the effective space function depends solely on the actual space of the crossing wires while allowing for additional control of two or more functional parameters. Each space between neighbor nets 402 can be reduced and the metal widths increased, as a function of the original space and a modification of two or more function parameters, to define segments of the target area. These segments can then be used when apportioning the capacitance values from the necessary pre-characterized 2D results, in order to account for fringing and other real-configuration effects.

The effective space function is defined as a parameterized function of the original space and two or more function parameters that can be adjusted. The parameters can be set to account for 3D effects and match closely to field solver results, while also ensuring a best or optimized 3D wiring pattern is determined to perform a capacitance extraction. According to a non-limiting embodiment, the effective space function can be defined as:

$$f(s)=s^2(s+S_0)/(s^2+2sS_0+S_0S_1), \text{ where}$$

"s" is a given spacing between neighbor net; and $S_0$ and $S_1$ are adjustable parameters that are set to obtain best matching wiring patterns determined using a fitting process.

According to at least one non-limiting embodiment, $S_0$ and $S_1$ are chosen independently for the above and below crossing wires, so, for this suggested implementation, there are four parameters to fit. Parameter $S_0$ can be defined as a first sum of the vertical distance from the target net 400 to the bottom of the above layer plus the thickness of the above layer, i.e., ($S_0$=(height to above/below metal)+ (thickness of above/below metal)), where the value is adjusted or set to adjusted to work best for a wider space between crossing wires. $S_1$ can be defined as a second sum of the vertical distance from the target net 400 to the bottom of the above layer plus the thickness of the above layer, i.e., ($S_1$=(height to above/below metal)+ (thickness of above/below metal)), where the value is adjusted or set to adjusted to work best for a narrower space between crossing wires. It should be appreciated that higher refinement can be obtained with increased polynomial orders, or with other forms of equations that define the effective space function without departing from the scope of the present disclosure.

Figure 10:
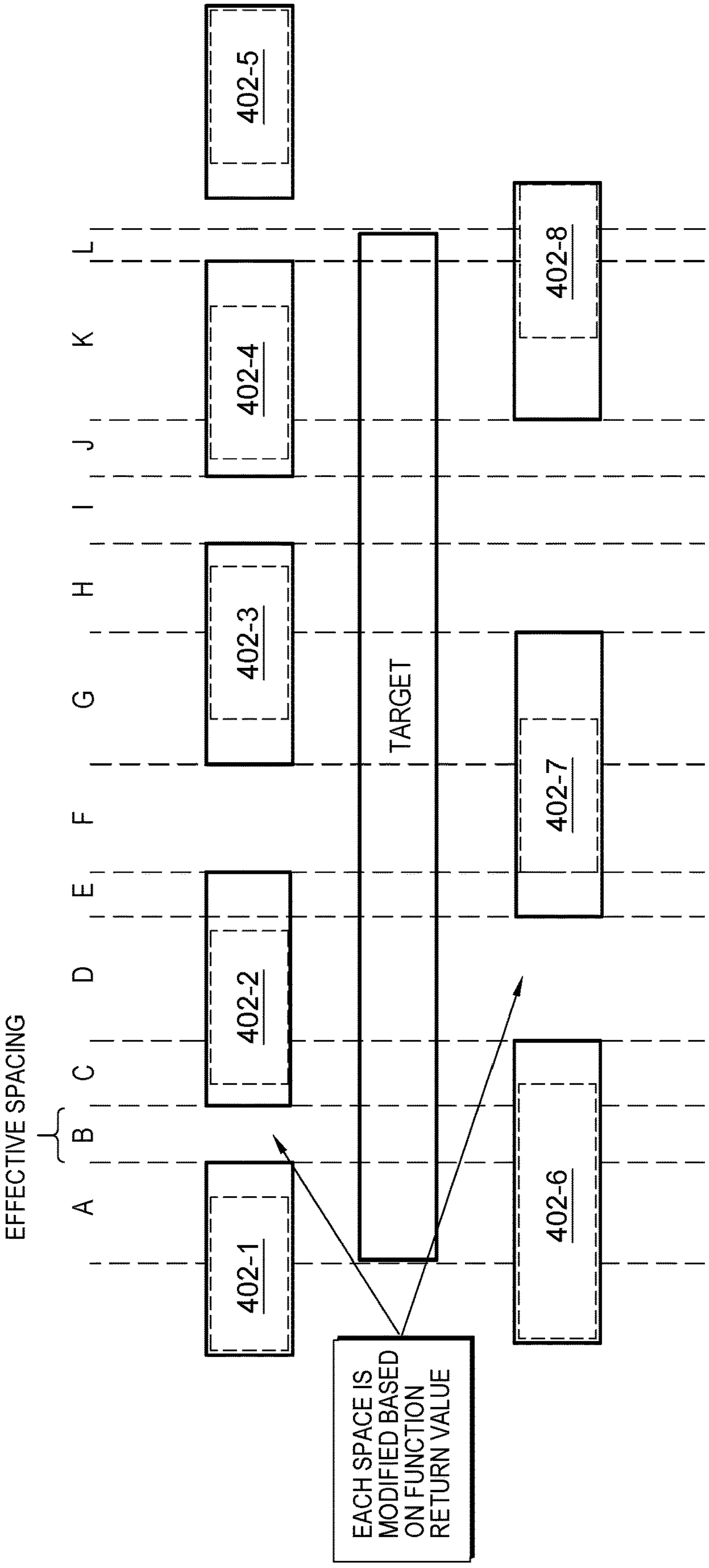
FIG. 10 depicts one embodiment of identifying target wiring patterns extending above and below based on the effective spacings of FIG. 9, in accordance with one or more aspects of the present disclosure.

FIG. 10 illustrates the configuration of FIG. 9 where each original spacing has been modified to derive the effective spacing (Se) based on an effective spacing function return value, in accordance with an example embodiment. The method for determining the effective spacing and effective net widths is described below by way of example in conjunction with FIG. 9. As illustrated in FIG. 10, the dashed rectangles represent the physical width and the solid rectangles represent the effective width of the neighbor nets 402 (i.e., 402-1 . . . 402-8, in the example).

According to a non-limiting embodiment, a reduced pattern database can be used to obtain a 3D wiring pattern to provide fast/accurate extraction results when extracting parasitic capacitances from a circuit design. The reduced pattern database includes a number of regularly repeating wire patterns above and below the target wire. Different embodiments of the invention use different reduced pattern databases. For each pattern in a pattern set, a field solver finds the capacitance per unit length for an infinitely repeating pattern of the crossing wire pattern. Key values (related to the crossing wires) that will define each distinct pattern include the cumulative crossing wire widths (above and below the target) and the discrete crossing wire spacings (both above and below the target). Allowing for infinite granularity in wire spacings and widths would of course lead to an infinite pattern set. However, it is possible to intelligently constrain the granularity of these values and still produce a working system.

The aforementioned considerations provide some natural bounds for the number of patterns by specifying min/max widths and spacings for wires. Additionally, there are some physical limits that one might use to set the upper/lower bounds of these values. For example, one might say that if the spacing between wires goes above a certain threshold, treat the distance between wires as infinite. Once upper and lower bounds for these sizes are set, one could then determine how many intermediate sizes one would like to consider in a pattern set. For example, if wire widths are limited to being between 100 nm and 200 nm, one could decide to generate patterns at even intervals of 10 nm between the min and max settings, resulting in eleven allowable wire widths. Of course, the sampling does not need to be uniform, as one might choose to use, for example, samples of 100 nm, 120 nm, 160 nm, 200 nm if that fits the most common wire usage in a design paradigm. One pertinent aspect is that it is possible to develop reasonable constraints on the rules used to generate this reduced pattern database to prevent its size from becoming intractable for real computation. Also, it should be noted that the potential number of wire width/spacing combinations existing in any reduced pattern database pales in comparison to the number of distinct wire patterns possible in a design, where each wire to be analyzed might contain hundreds of crossing wires with varying widths and spacings.

Considering the aforementioned principles, the number of patterns sufficient for accurate extraction is greatly reduced since the patterns can be reduced to uniform width, evenly spaced crossing wire patterns-every possible wide width and spacing combination does not have to be recognized and processed by a field solver and stored. Indeed, in one or more embodiments, each wiring pattern of the reduced pattern database has a first uniform wire width and a first uniform wire spacing in segments of a first adjacent wiring layer and has a second uniform wire width and a second uniform wire spacing in segments of a second adjacent wiring layer (opposite the first adjacent wiring layer across a target wiring layer), and the first and second uniform wire width and wire spacings are the same or different among each of the wiring patterns. In extracting the capacitance of an arbitrary wiring layout, field solutions for suitable patterns can be retrieved from the reduced pattern database, interpolated, and combined to arrive at acceptably accurate estimates of parasitic capacitance. Accordingly, for a typical wiring layer, only several thousand such patterns would be needed in contrast to probably several million suggested in the literature to achieve similar accuracy, which would likely be intractable for a typical capacitance extraction implementation.

Figure 11:
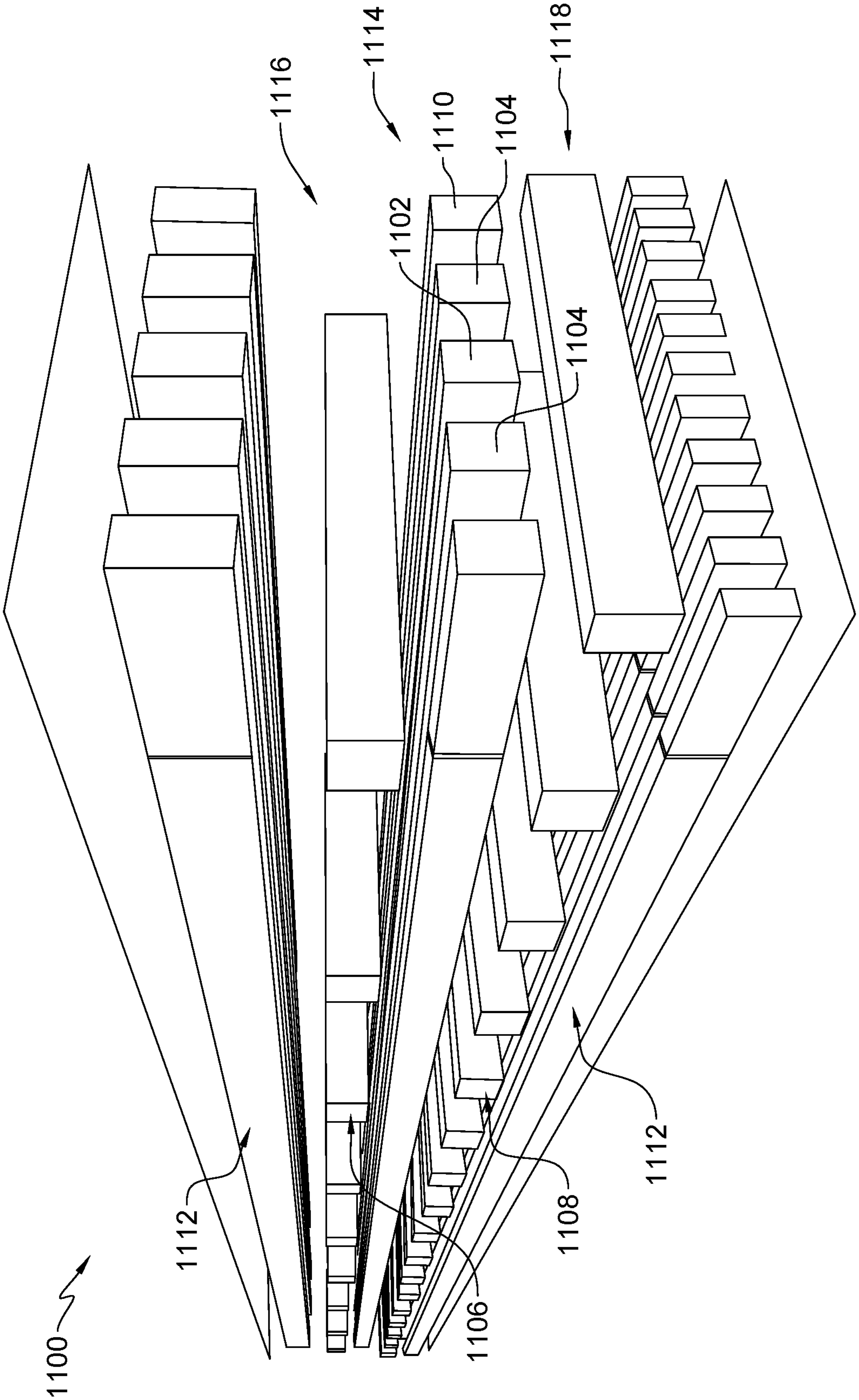
FIG. 11 depicts a typical BEOL wiring example, in accordance with a non-limiting embodiment of the present disclosure.

By way of further example, FIG. 11 illustrates an arrangement of BEOL wiring 1100 defining a 3D wiring pattern according to a non-limiting embodiment. The BEOL wiring 1100 includes a target wire 1102, lateral neighbors 1104, crossing wires 1106 immediately above the target wire 1102, crossing wires 1108 immediately below the target wire 1102, and distal wires 1110, 1112. The target wire 1102, its lateral neighbors 1104, and the distal wires 1110 define a target wiring layer 1114. The crossing wires 1106 define a first adjacent wiring layer 1116. The crossing wires 1108 define a second adjacent wiring layer 1118. The example of the BEOL wiring 1100 illustrated in FIG. 11 presumes uniform widths and spacing between the crossing wires 1106 and between the crossing wires 1108. This is a useful assumption for assembling a reduced pattern database.

Figure 12:
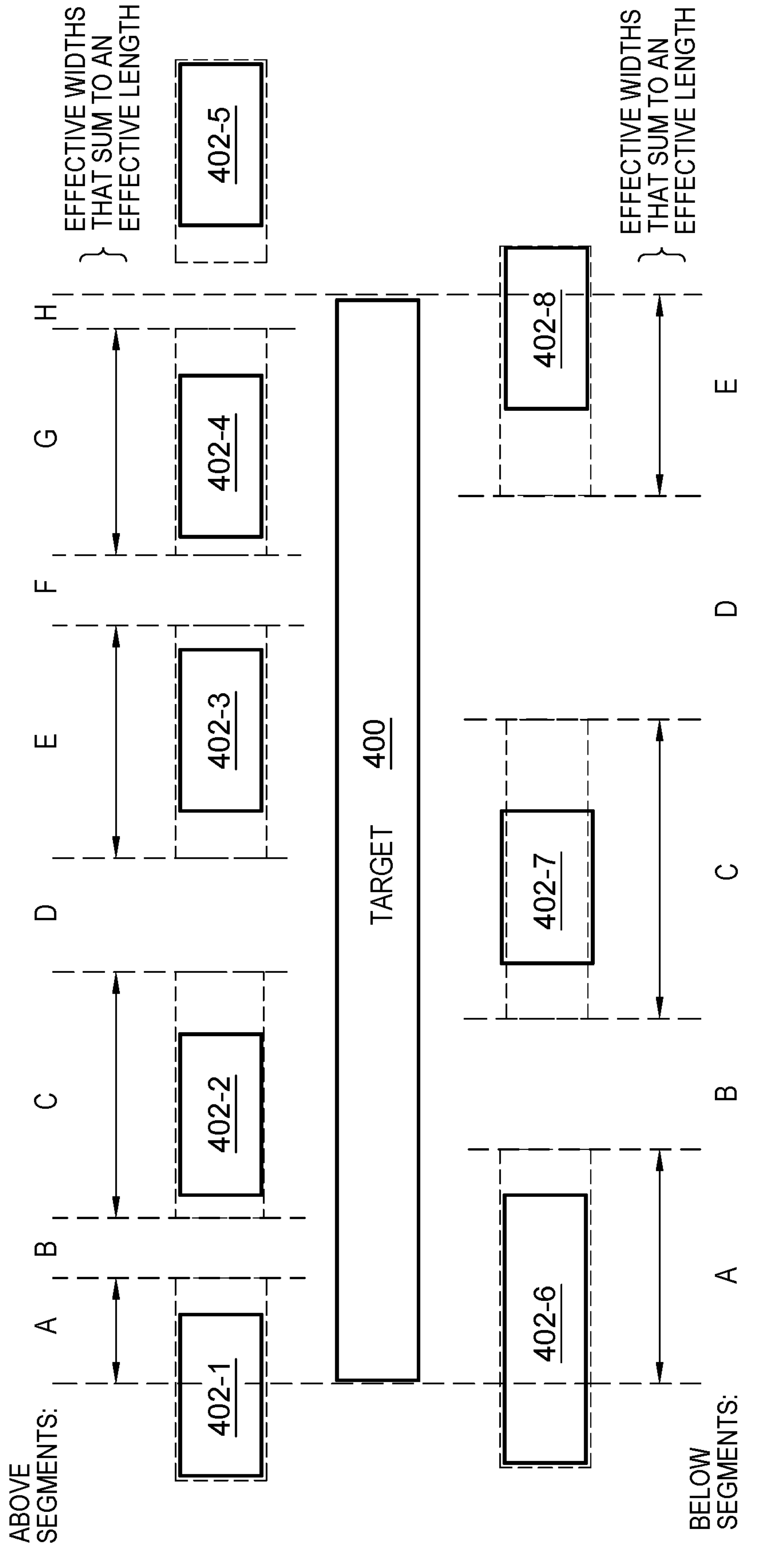
FIG. 12 illustrates the configuration of FIGS. 4 & 8, with crosswire pattern segmentation being done separately for wires at the upper target-wire side and the lower target-wire side, in accordance with one or more aspects of the present disclosure.
Figure 13:
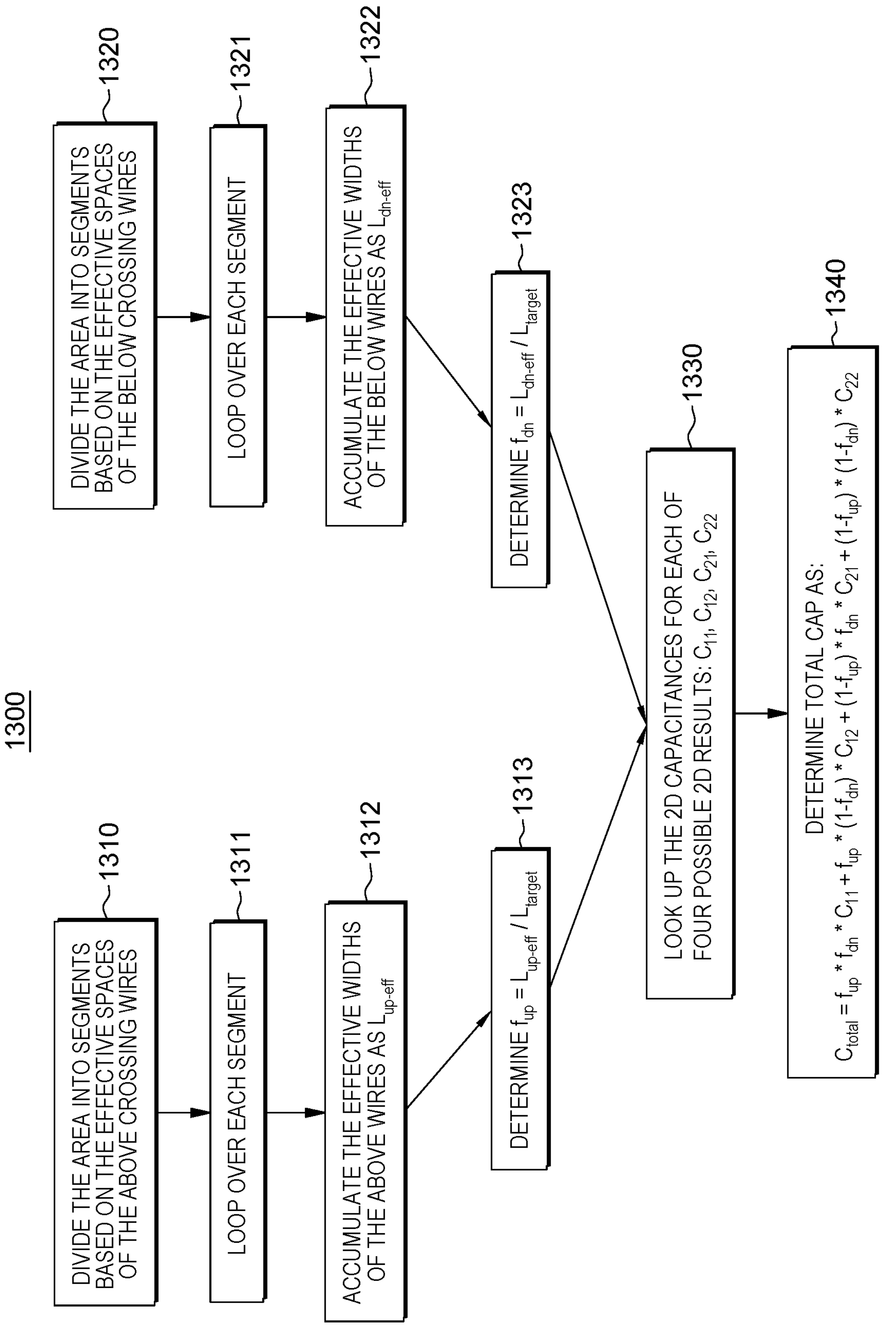
FIG. 13 illustrates a further example of a capacitance extraction workflow, in accordance with one or more aspects of the present disclosure.

As noted above, in one or more aspects, improved processing within a computing environment is further provided herein by, for instance, leveraging separation of capacitance analysis at different target wire sides to achieve simplification and speed-up of capacitive extraction-related processing, without significant loss of accuracy. For instance, simplification of the extraction process or algorithm is achieved, and processing performance is improved, in one or more aspects, by recognizing that there is a certain amount of screening between capacitive interactions of a target wire, with crossing wires on one side the target wire, and crossing wires at the opposite side of the target wire, such as with crossing wires above and below the target wire. Based on the screening, the exact positions of the crossing wires relative to each other on opposite sides of the target wire can be considered to have a small effect on the overall capacitance of the target wire. Disclosed herein with reference to FIGS. 12-13 is an enhanced capacitive extraction-related process, which leverages, in part, separation of the capacitance analysis on different target wire sides of a target wire. In one or more embodiments, the capacitance extraction-related processing and analysis disclosed can include adjustment of crossing wires on opposite sides of the target wire to match different configuration patterns, and the analysis can include, in one or more embodiments, making tuning-like variations in the crossing wire properties, such as making width adjustments, such as described herein. In this manner, processing performance is improved by minimizing the computations needed for each crossing wire, as well as by implementing (in certain embodiments) parallelization of one or more of the process steps.

FIG. 12 illustrates a configuration for a target wire capacitance analysis, where each original spacing on the different target wire sides is modified to derive an effective spacing based on an effective spacing function return value, in accordance with an example embodiment such as described herein. As illustrated in FIG. 12, the solid rectangles represent the physical width, and the dashed rectangles represent the effective widths of the neighbor nets 402 (i.e., 402-1 . . . 402-8, in the example). In the embodiment of FIG. 12, there are eight segments identified above target wire 400 and five segments identified below the target wire, with the segments being separately processed, that is, the segments at the upper target-wire side are processed separately from the segments at the below target-wire side. Further, the effective widths sum to an effective length at the upper target-wire side, and the effective widths at the lower target-wire side sum to another effective length value. In this manner, segmentation is handled separately for, for instance, the crossing wires at one target-wire side and crossing wires at the other target-wire side, where the one and other target-wire sides are opposite sides of the target wire, such as upper and lower target-wire sides in one or more embodiments.

Generally stated, in one or more aspects, provided herein are computer-implemented methods, computer program products and computer systems for facilitating design and manufacture of circuits, such as integrated circuits, and in particular, for the analysis and optimization of such circuits. In one or more embodiments, the method includes obtaining a wiring pattern of an integrated circuit for performing pattern-based capacitive extraction, and separating, by at least one processor set, a target wire included in the wiring pattern into one set of segments based on effective spaces of crossing wires at one target-wire side, and separating the target wire into another set of segments based on effective spaces of crossing wires at another target-wire side. In one or more implementations, the method further includes accumulating, by the at least one processor set, effective widths of crossing wires at the one target-wire side, and accumulating effective widths of crossing wires at the other target-wire side, and determining one effective length factor for crossing wires at the one target-wire side using the effective widths of crossing wires at the one target-wire side, and another effective length factor for crossing wires at the other target-wire side using the effective widths of crossing wires at the other target-wire side. In addition, the method includes ascertaining, by the at least one processor set with reference to a data structure of capacitances per-unit-length for identified configurations, one or more capacitance values for the one target-wire side, and one or more capacitance values for the other target-wire side. In one or more embodiments, the method includes determining a total capacitance corresponding to the target wire using the one effective length factor, the other effective length factor, and the ascertained capacitance values for the one target-wire side and the other target-wire side. In addition, the method includes, in one or more embodiments, assessing an impact of the determined total capacitance on circuit performance, and based on the assessing of the impact on the circuit performance, producing a modified design by modifying the wiring pattern of the integrated circuit.

In one or more embodiments, separating of the target wire into the other set of segments based on the effective spaces of crossing wires at the other target-wire side is independent from the separating of the target wire into the one set of segments based on the effective spacing of crossing wires at the one target-wire side. In one embodiment, the one target-wire side and the other target-wire side are opposite sides of the target wire.

In one or more implementations, determining the one effective length factor for the crossing wires on the one target-wire side includes dividing, by the at least one processor set, the accumulated effective widths of crossing wires at the one target-wire side by a target length, and determining the other effective length factor includes dividing the accumulated effective widths of crossing wires at the other target-wire side by the target length.

In one or more embodiments, separating the target wire into the other set of segments based on effective spaces of crossing wires at the other target-wire side, the accumulating effective widths of crossing wires at the other target-wire side, and the determining the other effective length factor for the crossing wires at the other target-wire side, are performed by the at least one processor set in parallel with the separating of the target wire into the one set of segments based on effective spaces of crossing wires at the one target-wire side, the accumulating effective widths of crossing wires at the target-wire side, and the determining of one effective length factor for the crossing wires at the one target-wire side.

In one or more embodiments, the one target-wire side is an upper target-wire side, and the other target-wire side is a lower target-wire side. In one or ore embodiments, determining the capacitance values for the upper target-wire side and the lower target-wire side includes determining a 2D capacitance value to one-level-up wiring ($C_{11}$), and two-level-up wiring ($C_{12}$), at the upper target-wire side, and determining a 2D capacitance value due to one-level-down wiring ($C_{21}$), and two-level-down wiring ($C_{22}$) at the lower target-wire side.

In one or more embodiments, determining the total capacitance corresponding to the target wire includes scaling the determined capacitance values based on the one effective length factor and the other effective length factor.

In one or more embodiments, determining the total capacitance corresponding to the target wire includes determining the total capacitance based on a formula, such as described below with reference to FIG. 13.

By way of example, FIG. 13 depicts a further embodiment of a capacitance extraction workflow 1300, in accordance with one or more aspects of the present disclosure. FIG. 13 illustrates one embodiment for leveraging separation of the capacitive analysis to (for instance) the above or upper target-wire side, and the below or lower target-wire side, to achieve improved performance and simplification of processing, without significant loss of accuracy. In this approach, segments formed by the extended width crossing wires are determined independently for the upper crossing wires and the lower crossing wires. For instance, as illustrated in FIG. 13, the target area (or wire) is divided into segments based on the effective spaces of the above crossing wires 1310, and processing loops over each segment 1311 to accumulate the effective widths of the above wires as $L_{up\text{-}eff}$ 1312. From this, an effective length factor is determined by dividing the above effective length by the target length 1313. Similar processing is separately performed for the crossing wires below the target wire. This separate processing can be, in one or more embodiments, in parallel with the above wire processing. In particular, the area of the target wire is divided into segments based on the effective spaces of the below of lower crossing wires 1320, and processing loops over each determined segment 1321 and accumulates the effective widths of the below wire segments as an effective length $L_{eff\text{-}dn}$ 1322. The corresponding effective length factor is then determined for the lower target-wire side by, for instance, dividing the lower length by the target length 1323.

As illustrated in FIG. 13, in one or more embodiments, four potential 2D capacitance vectors for the different four-plate configurations, as described above, are determined. For instance, in one or more embodiments, a 2D capacitance value is determined (e.g., using a data structure look up of capacitances per-unit-length for identified configurations) due to one-level-up wiring ($C_{11}$), and two-level-up wiring ($C_{12}$), at the upper target-wire side, and a 2D capacitance value is determined due to one-level-down wiring ($C_{21}$), and two-level-down wiring ($C_{22}$) at the lower target-wire side 1330. The capacitance values or vectors are then scaled based on the effective length factors to determine the total capacitance of the target wire 1340. In one embodiment, the scaling to determine total capacitance can be in accordance with a formula, such as:

$$C_{total}=f_{up}\times f_{dn}\times C_{11}+f_{up}\times(1-f_{dn})\times C_{12}+(1-f_{up})\times f_{dn}\times C_{21}+(1-f_{up})\times(1-f_{dn})\times C_{22},$$

wherein:

$C_{total}$=total capacitance;

$f_{up}$=effective length factor for the upper target-wire side;

$f_{dn}$=effective length factor for the lower target-wire side;

$C_{11}$=2D capacitance value due to one-level-up wiring at the upper target-wire side;

$C_{12}$=2D capacitance value due to two-level-up wiring at the upper target-wire side;

$C_{21}$=2D capacitance value due to one-level-lower wiring at the lower target-wire side; and $C_{22}$=2D capacitance value due to two-level-lower wiring at the lower target-wire side.

Since there are likely hundreds of crossing wires for any given wire area, performance is gained by minimizing the analysis needed for each crossing wire. As noted, it is also possible to parallelize the upper and lower effective length factor determinations, such as illustrated in FIG. 13.

In one or more embodiments, a further step includes fabricating a physical integrated circuit in accordance with the VLSI design. One non-limiting specific example that accomplishes this is described herein in connection with FIGS. 14-16. For example, a design structure, based on the VLSI design, is provided to fabrication equipment to facilitate fabrication of a physical integrated circuit in accordance with the design structure.

In one or more embodiments, a layout is prepared based on the analysis. In one or more embodiments, the layout is instantiated as a design structure. In one or more embodiments, a physical integrated circuit is fabricated in accordance with the design structure.

Figure 14:
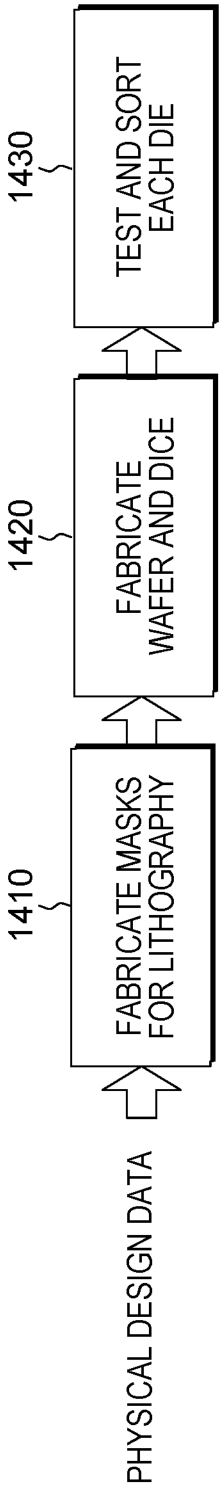
FIG. 14 is a flow diagram of a design process used in semiconductor design, manufacture, and test, in accordance with one or more aspects of the present disclosure.

As noted, in one or more embodiments, the layout is instantiated as a design structure. A physical integrated circuit is then fabricated in accordance with the design structure. Refer also to discussion for FIGS. 14-16. FIG. 14 is a flow diagram of a design process used in semiconductor design, manufacture, and/or test. Once the physical design data is obtained, based, in part, on the design processes described herein, an integrated circuit designed in accordance therewith can be fabricated according to known processes that are generally described with reference to FIG. 14. Generally, a wafer with multiple copies of the final design is fabricated and cut (i.e., diced) such that each die is one copy of the integrated circuit. At block 1410, the processes include fabricating masks for lithography based on the finalized physical layout. At block 1420, fabricating the wafer includes using the masks to perform photolithography and etching. Once the wafer is diced, testing and sorting each die is performed at 1430 to filter out any faulty die. Furthermore, referring to FIGS. 14-16, in one or more embodiments the at least one processor is operative to generate a design structure for the integrated circuit design in accordance with the VLSI design, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of proper capacitance extraction) compared to circuits designed using prior art techniques, at least under conditions where there is the same CPU time budget for the design process. To achieve similar improvements with prior-art techniques, even if possible, would require expenditure of more CPU time as compared to embodiments of the invention.

Figure 15:
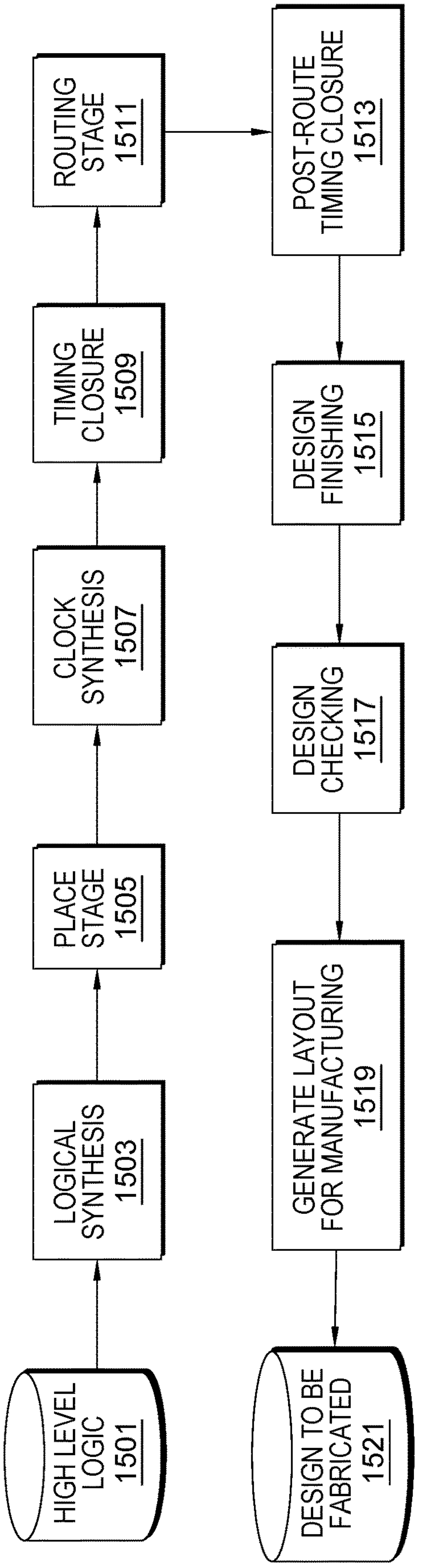
FIG. 15 depicts a further example of integrated circuit fabrication, including generating physical design data, in accordance with one or more aspects of the present disclosure.

FIG. 15 depicts an example high-level Electronic Design Automation (EDA) tool flow, which is responsible for creating an optimized microprocessor (or other IC) design to be manufactured. A designer can start with a high-level logic description 1501 of the circuit (e.g. VHDL or Verilog). The logic synthesis tool 1503 compiles the logic and optimizes it without any sense of its physical representation, and with estimated timing information. Placement tool 1505 takes the logical description and places each component, looking to minimize congestion in each area of the design. The clock synthesis tool 1507 optimizes the clock tree network by cloning/balancing/buffering the latches or registers. The timing closure step 1509 performs a number of optimizations on the design, including buffering, wire tuning, and circuit repowering; its goal is to produce a design which is routable, without timing violations, and without excess power consumption. Routing stage 1511 takes the placed/optimized design and determines how to create wires to connect the components, without causing manufacturing violations. Post-route timing closure 1513 performs another set of optimizations to resolve any violations that are remaining after the routing. Design finishing 1515 then adds extra metal shapes to the netlist, to conform with manufacturing requirements. Checking steps 1517 analyze whether the design is violating any requirements such as manufacturing, timing, power, electromigration or noise. When the design is clean, the final step 1519 is to generate a layout for the design, representing all the shapes to be fabricated in the design to be fabricated 1521.

Figure 16:
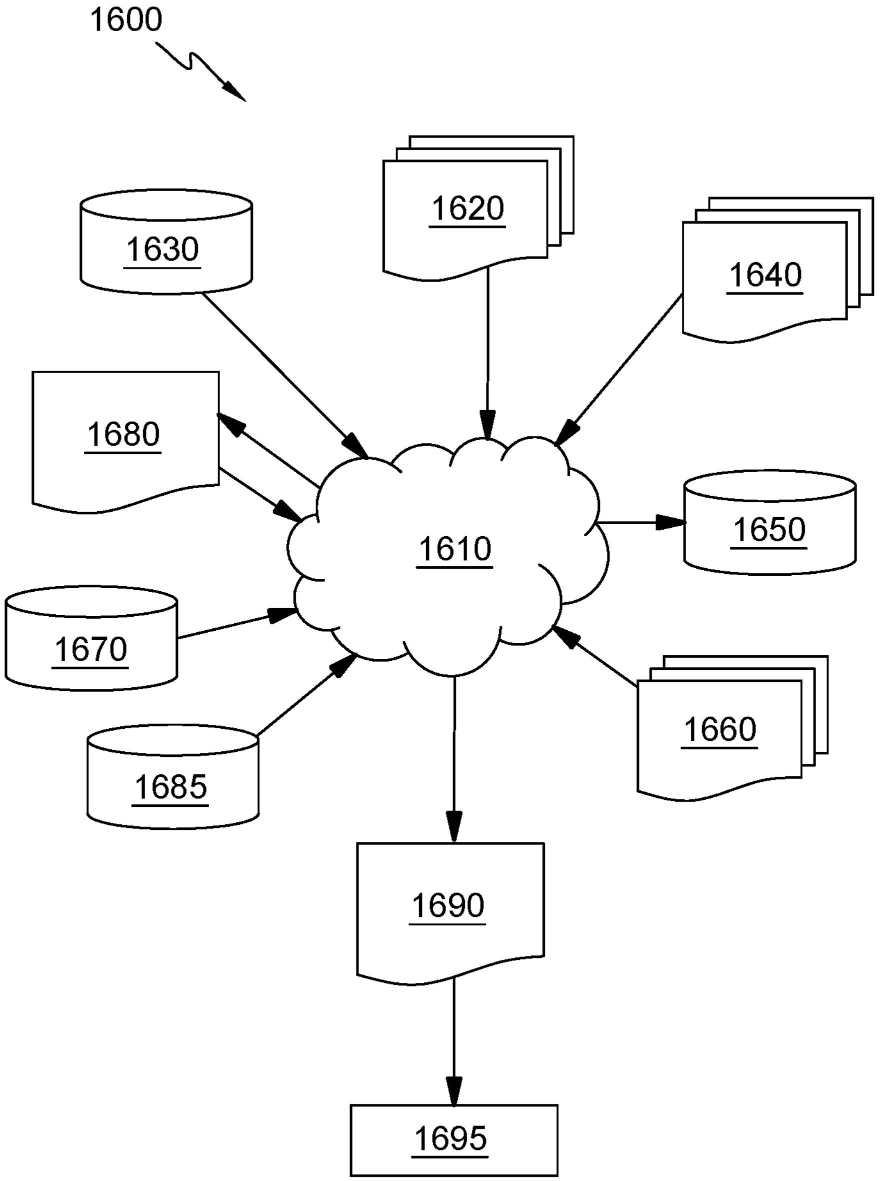
FIG. 16 shows an exemplary high-level Electronic Design Automation (EDA) tool flow, within which aspects of the present disclosure can be employed.

One or more embodiments integrate the timing analysis techniques herein with semiconductor integrated circuit design simulation, test, layout, and/or manufacture. In this regard, FIG. 16 shows a block diagram of an exemplary design flow 1600 used for example, in semiconductor IC logic design, simulation, test, layout, and manufacture. Design flow 1600 includes processes, machines and/or mechanisms for processing design structures or devices to generate logically or otherwise functionally equivalent representations of design structures and/or devices, such as those that can be analyzed using timing analysis or the like. The design structures processed and/or generated by design flow 1600 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g., E-V writers), computers, or equipment for simulating design structures, any apparatus used in the manufacturing or test process, or any machines for programming functionality equivalent representations of the design structures into any medium (e.g., a machine for programming a programmable gate array).

Design flow 1600 may vary depending on the type of representation being designed. For example, a design flow 1600 for building an application specific IC (ASIC) may differ from a design flow 1600 for designing a standard component or from a design flow 1600 for instantiating the design into a programmable array, for example a programmable gate array (PGA) or a field programmable gate array (FPGA).

FIG. 16 illustrates multiple such design structures 1620 that is preferably processed by a design process 1610. Design structure 1620 may be a logical simulation design structure generated and processed by design process 1610 to product a logically equivalent functional representation of a hardware device. Design structure 1620 may also or alternatively comprise data and/or program instructions that when processed by design process 1610, generate a functional representation of the physical structure of a hardware device. Whether representing functional and/or structural design features, design structure 1620 may be generated using electronic computer-aided design (ECAD), such as implemented by a core developer/designer. When encoded on a gate array or storage medium of the loke, design structure 1620 may be accessed and processed by one or more hardware and/or software modules within design process 1610 to simulate or otherwise functionally represent an electronic component, circuit, electronic or logic module, apparatus, device, or system. As such, design structure 1620 may comprise files or other data structures including human and/or machine-readable source code, compiled structures, and computer executable code structure that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages, such as Verilog and VHDL, and/or higher level design languages, such as C or C++.

Design process 1610 preferably employs and incorporates hardware and/or software modules for synthesizing, translating, or otherwise processing a design/simulation functional equivalent of components, circuits, devices, or logic structures to generate a Netlist 1680, which may contain design structures such as design structure 1620. Netlist 1680 may comprise, for example, compiled or otherwise processed data structures representing a list of wires, discrete components, logic gates, control circuits, I/O devices, modules, etc., that describes the connections to other elements and circuits in an integrated circuit design. Netlist 1680 may be recorded on a machine-readable data storage medium or programmed into a programmable gate array, a compact flash, or other flash memory. Additionally, or in the alternative, the medium may be a system or cache memory, buffer space, or other suitable memory.

Design process 1610 may include hardware and software modules for processing a variety of input data structure system, including Netlist 1680. Such data structure types may reside, for example, within library elements 1630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1640, characterization data 1650, verification data 1660, design rules 1670, and test data files 1685, which may include input test patterns, output test results, and other testing information. Design process 1610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1610 without deviating from the scope and spirit of the invention. Design process 1610 may also include modules for performing standard circuit design processes such as timing analysis, verification, design rule checking, place and route operations, etc. Improved placement can be performed as described herein.

Design process 1610 employs and incorporates logic and physical design tools such as HDL compilers and simulation model build tools to process design structure 1620 together with some or all of the depicted supporting data structures along with any additional mechanical design or data (if applicable), to generate a second design structure 1690. Design structure 1690 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1620, design structure 1690 preferably comprises one or 10 more files, data structures, or other computer-encoded data or instructions that reside on data storage media and that when processed by an ECAD system generate a logically or otherwise functionally equivalent form of one or more IC designs or the like. In one embodiment, design structure 1690 may comprise a compiled, executable HDL simulation model that functionally simulates the devices to be analyzed.

Design structure 1690 may also employ a data format used for the exchange of layout data of integrated circuits. and/or symbolic data format (e.g. information stored in a GDSII (GDS2), GL1, OASIS, map files, or any other suitable format for storing such design data structures). Design structure 1690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 1690 may then proceed to a stage 1695 where, for example, design structure 1690: proceeds to tape-out, is released to manufacturing, is released to a mask house, is sent to another design house, is sent back to the customer, etc.

The terminology used herein is for the purpose of describing particular embodiments only and is not intended to be limiting of the disclosure. As used herein, the singular forms "a", "and" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

obtaining a wiring pattern of an integrated circuit for performing pattern-based capacitive extraction;

separating, by at least one processor set, a target wire included in the wiring pattern into one set of segments based on effective spaces of crossing wires at one target-wire side;

separating, by the at least one processor set, the target wire into another set of segments based on effective spaces of crossing wires at another target-wire side;

accumulating, by the at least one processor set, effective widths of crossing wires at the one target-wire side, and accumulating effective widths of crossing wires at the other target-wire side;

determining, by the at least one processor set, one effective length factor for crossing wires at the one target-wire side using the effective widths of crossing wires at the one target-wire side, and another effective length factor for crossing wires at the other target-wire side using the effective widths of crossing wires at the other target-wire side;

ascertaining, by the at least one processor set with reference to a data structure of capacitances per-unit-length for identified configurations, one or more capacitance values for the one target-wire side, and one or more capacitance values for the other target-wire side;

determining a total capacitance corresponding to the target wire using the one effective length factor, the other effective length factor, and the ascertained capacitance values for the one target-wire side and the other target-wire side;

assessing an impact of the determined total capacitance on circuit performance; and based on the assessing of the impact on the circuit performance, producing a modified design by modifying the wiring pattern of the integrated circuit.

2. The computer-implemented method of claim 1, wherein the separating of the target wire into the other set of segments based on effective spaces of crossing wires at the other target-wire side is independent from the separating of the target wire into the one set of segments based on effective spacing of crossing wires at the one target-wire side.

3. The computer-implemented method of claim 2, wherein the one target-wire side and the other target-wire side are opposite sides of the target wire.

4. The computer-implemented method of claim 1, wherein determining the one effective length factor for the crossing wires on the one target-wire side comprises dividing, by the at least one processor set, the accumulated effective widths of crossing wires at the one target-wire side by a target length, and determining the other effective length factor comprises dividing the accumulated effective widths of crossing wires at the other target-wire side by the target length.

5. The computer-implemented method of claim 1, wherein the separating the target wire into the other set of segments based on effective spaces of crossing wires at the other target-wire side, the accumulating effective widths of crossing wires at the other target-wire side, and the determining the other effective length factor for the crossing wires at the other target-wire side, are performed by the at least one processor set in parallel with the separating of the target wire into the one set of segments based on effective spaces of crossing wires at the one target-wire side, the accumulating effective widths of crossing wires at the one target-wire side, and the determining of one effective length factor for the crossing wires at the one target-wire side.

6. The computer-implemented method of claim 1, wherein the one target-wire side is an upper target-wire side, and the other target-wire side is a lower target-wire side.

7. The computer-implemented method of claim 6, wherein determining the capacitance values for the upper target-wire side and the lower target-wire side includes determining a 2D capacitance value due to one-level-up wiring ($C_{11}$), and two-level-up wiring ($C_{12}$), at the upper target-wire side, and determining a 2D capacitance value due to one-level-down wiring ($C_{21}$), and two-level-down wiring ($C_{22}$) at the lower target-wire side.

8. The computer-implemented method of claim 7, wherein determining the total capacitance corresponding to the target wire comprises scaling the determined capacitance values based on the one effective length factor and the other effective length factor.

9. The computer-implemented method of claim 7, wherein determining the total capacitance corresponding to the target wire includes determining the total capacitance using the following formula:

$$C_{total}=f_{up}\times f_{dn}\times C_{11}+f_{up}\times(1-f_{dn})\times C_{12}+(1-f_{up})\times f_{dn}\times C_{21}+(1-f_{up})\times(1-f_{dn})\times C_{22},$$

wherein:

$C_{total}$=total capacitance;

$f_{up}$=effective length factor for the upper target-wire side;

$f_{dn}$=effective length factor for the lower target-wire side;

$C_{11}$=2D capacitance value due to one-level-up wiring at the upper target-wire side;

$C_{12}$=2D capacitance value due to two-level-up wiring at the upper target-wire side;

$C_{21}$=2D capacitance value due to one-level-lower wiring at the lower target-wire side; and $C_{22}$=2D capacitance value due to two-level-lower wiring at the lower target-wire side.

10. A computer program product comprising:

a set of one or more computer-readable storage media; and program instructions, collectively stored in the set of one or more storage media, for causing at least one processor set to perform computer operations comprising:

obtaining a wiring pattern of an integrated circuit for performing pattern-based capacitive extraction;

separating a target wire included in the wiring pattern into one set of segments based on effective spaces of crossing wires at one target-wire side;

separating the target wire into another set of segments based on effective spaces of crossing wires at another target-wire side;

accumulating effective widths of crossing wires at the one target-wire side, and accumulating effective widths of crossing wires at the other target-wire side;

determining one effective length factor for crossing wires at the one target-wire side using the effective widths of crossing wires at the one target-wire side, and another effective length factor for crossing wires at the other target-wire side using the effective widths of crossing wires at the other target-wire side;

ascertaining with reference to a data structure of capacitances per-unit-length for identified configurations, one or more capacitance values for the one target-wire side, and one or more capacitance values for the other target-wire side;

determining a total capacitance corresponding to the target wire using the one effective length factor, the other effective length factor, and the ascertained capacitance values for the one target-wire side and the other target-wire side;

assessing an impact of the determined total capacitance on circuit performance; and based on the assessing of the impact on the circuit performance, producing a modified design by modifying the wiring pattern of the integrated circuit.

11. The computer program product of claim 10, wherein:

the separating of the target wire into the other set of segments based on effective spaces of crossing wires at the other target-wire side is independent from the separating of the target wire into the one set of segments based on effective spacing of crossing wires at the one target-wire side; and the one target-wire side and the other target-wire side are opposite sides of the target wire.

12. The computer program product of claim 10, wherein determining the one effective length factor for the crossing wires on the one target-wire side comprises dividing, by the at least one processor set, the accumulated effective widths of crossing wires at the one target-wire side by a target length, and determining the other effective length factor comprises dividing the accumulated effective widths of crossing wires at the other target-wire side by the target length.

13. The computer program product of claim 10, wherein the separating the target wire into the other set of segments based on effective spaces of crossing wires at the other target-wire side, the accumulating effective widths of crossing wires at the other target-wire side, and the determining the other effective length factor for the crossing wires at the other target-wire side, are performed by the at least one processor set in parallel with the separating of the target wire into the one set of segments based on effective spaces of crossing wires at the one target-wire side, the accumulating effective widths of crossing wires at the one target-wire side, and the determining of one effective length factor for the crossing wires at the one target-wire side.

14. The computer program product of claim 10, wherein the one target-wire side is an upper target-wire side, and the other target-wire side is a lower target-wire side, and wherein determining the capacitance values for the upper target-wire side and the lower target-wire side includes determining a 2D capacitance value due to one-level-up wiring ($C_{11}$), and two-level-up wiring ($C_{12}$), at the upper target-wire side, and determining a 2D capacitance value due to one-level-down wiring ($C_{21}$), and two-level-down wiring ($C_{22}$) at the lower target-wire side.

15. The computer program product of claim 14, wherein determining the total capacitance corresponding to the target wire comprises scaling the determined capacitance values based on the one effective length factor and the other effective length factor.

16. The computer program product of claim 14, wherein determining the total capacitance corresponding to the target wire includes determining the total capacitance using the following formula:

$$C_{total}=f_{up}\times f_{dn}\times C_{11}+f_{up}\times(1-f_{dn})\times C_{12}+(1-f_{up})\times f_{dn}\times C_{21}+(1-f_{up})\times(1-f_{dn})\times C_{22},$$

wherein:

$C_{total}$=total capacitance;

$f_{up}$=effective length factor for the upper target-wire side;

$f_{dn}$=effective length factor for the lower target-wire side;

$C_{11}$=2D capacitance value due to one-level-up wiring at the upper target-wire side;

$C_{12}$=2D capacitance value due to two-level-up wiring at the upper target-wire side;

$C_{21}$=2D capacitance value due to one-level-lower wiring at the lower target-wire side; and $C_{22}$=2D capacitance value due to two-level-lower wiring at the lower target-wire side.

17. A computer system comprising:

at least one processor set;

a set of one or more computer-readable storage media; and program instructions, collectively stored in the set of one or more storage media, for causing the at least one processor set to perform computer operations comprising:

obtaining a wiring pattern of an integrated circuit for performing pattern-based capacitive extraction;

separating a target wire included in the wiring pattern into one set of segments based on effective spaces of crossing wires at one target-wire side;

separating the target wire into another set of segments based on effective spaces of crossing wires at another target-wire side;

accumulating effective widths of crossing wires at the one target-wire side, and accumulating effective widths of crossing wires at the other target-wire side;

determining one effective length factor for crossing wires at the one target-wire side using the effective widths of crossing wires at the one target-wire side, and another effective length factor for crossing wires at the other target-wire side using the effective widths of crossing wires at the other target-wire side;

ascertaining with reference to a data structure of capacitances per-unit-length for identified configurations, one or more capacitance values for the one target-wire side, and one or more capacitance values for the other target-wire side;

determining a total capacitance corresponding to the target wire using the one effective length factor, the other effective length factor, and the ascertained capacitance values for the one target-wire side and the other target-wire side;

assessing an impact of the determined total capacitance on circuit performance; and based on the assessing of the impact on the circuit performance, producing a modified design by modifying the wiring pattern of the integrated circuit.

18. The computer system of claim 17, wherein:

the separating of the target wire into the other set of segments based on effective spaces of crossing wires at the other target-wire side is independent from the separating of the target wire into the one set of segments based on effective spacing of crossing wires at the one target-wire side; and the one target-wire side and the other target-wire side are opposite sides of the target wire.

19. The computer system of claim 17, wherein determining the one effective length factor for the crossing wires on the one target-wire side comprises dividing, by the at least one processor set, the accumulated effective widths of crossing wires at the one target-wire side by a target length, and determining the other effective length factor comprises dividing the accumulated effective widths of crossing wires at the other target-wire side by the target length.

20. The computer system of claim 17, wherein the separating the target wire into the other set of segments based on effective spaces of crossing wires at the other target-wire side, the accumulating effective widths of crossing wires at the other target-wire side, and the determining the other effective length factor for the crossing wires at the other target-wire side, are performed by the at least one processor set in parallel with the separating of the target wire into the one set of segments based on effective spaces of crossing wires at the one target-wire side, the accumulating effective widths of crossing wires at the one target-wire side, and the determining of one effective length factor for the crossing wires at the one target-wire side.

* * * * *